US007728802B2

(12) United States Patent
Brown Elliott

(10) Patent No.: US 7,728,802 B2
(45) Date of Patent: Jun. 1, 2010

(54) ARRANGEMENTS OF COLOR PIXELS FOR FULL COLOR IMAGING DEVICES WITH SIMPLIFIED ADDRESSING

(75) Inventor: Candice Hellen Brown Elliott, Vallejo, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 576 days.

(21) Appl. No.: 11/072,814

(22) Filed: Mar. 4, 2005

(65) Prior Publication Data

US 2005/0174363 A1 Aug. 11, 2005

Related U.S. Application Data

(63) Continuation of application No. 09/916,232, filed on Jul. 25, 2001, now Pat. No. 6,903,754, which is a continuation-in-part of application No. 09/628,122, filed on Jul. 28, 2000, now Pat. No. 7,274,383.

(51) Int. Cl.
*G06F 3/038* (2006.01)
*G09G 5/00* (2006.01)

(52) U.S. Cl. ........................................ 345/88; 345/694

(58) Field of Classification Search ................. 345/694, 345/88, 204

See application file for complete search history.

(56) References Cited

U.S. PATENT DOCUMENTS

| | | | |
|---|---|---|---|
| 3,971,065 A | 7/1976 | Bayer | 358/41 |
| 4,353,062 A | 10/1982 | Lorteije et al. | |
| 4,593,978 A | 6/1986 | Mourey et al. | |
| 4,642,619 A | 2/1987 | Togashi | |
| 4,651,148 A | 3/1987 | Takeda et al. | |
| 4,751,535 A | 6/1988 | Myers | |

(Continued)

FOREIGN PATENT DOCUMENTS

DE 197 46 329 A1 3/1999

(Continued)

OTHER PUBLICATIONS

"Detectability of Reduced Blue Pixel Count in Projection Displays" R. Martin et al.

(Continued)

*Primary Examiner*—Amr Awad
*Assistant Examiner*—Michael Pervan
(74) *Attorney, Agent, or Firm*—Innovation Counsel LLP

(57) ABSTRACT

An array and row and column line architecture for a display is disclosed. The array consists of a plurality of row and column positions and a plurality of three-color pixel elements. A three-color pixel element can comprise a blue emitter, a pair of red emitters, and a pair of green emitters. Several designs for the three-color pixel element are contemplated. The drive matrix consists of a plurality of row and column drivers to drive the individual emitters. The row drivers drive the red, green and blue emitters in each row. The red and green emitters in each column are driven by a single column driver. However, a single column driver can drive two column lines of blue emitters, a first column line and a second column line of the next nearest neighboring three-color pixel element. Methods of driving a three-color pixel element are also disclosed.

6 Claims, 19 Drawing Sheets

U.S. PATENT DOCUMENTS

| | | | | |
|---|---|---|---|---|
| 4,773,737 | A | 9/1988 | Yokono et al. | |
| 4,786,964 | A | 11/1988 | Plummer et al. | 358/44 |
| 4,792,728 | A | 12/1988 | Chang et al. | |
| 4,800,375 | A | 1/1989 | Silverstein et al. | |
| 4,853,592 | A | 8/1989 | Strathman | |
| 4,874,986 | A | 10/1989 | Menn et al. | |
| 4,886,343 | A | 12/1989 | Johnson | 350/335 |
| 4,908,609 | A | 3/1990 | Stroomer | |
| 4,920,409 | A | 4/1990 | Yamagishi | 358/56 |
| 4,965,565 | A | 10/1990 | Noguchi | |
| 4,966,441 | A | 10/1990 | Conner | |
| 4,967,264 | A | 10/1990 | Parulski | 358/44 |
| 5,006,840 | A | 4/1991 | Hamada et al. | |
| 5,052,785 | A | 10/1991 | Takimoto et al. | |
| 5,113,274 | A | 5/1992 | Takahashi et al. | 359/66 |
| 5,132,674 | A | 7/1992 | Bottorf | |
| 5,144,288 | A | 9/1992 | Hamada et al. | |
| 5,184,114 | A | 2/1993 | Brown | |
| 5,189,404 | A | 2/1993 | Masimo et al. | |
| 5,233,385 | A | 8/1993 | Sampsell | |
| 5,311,337 | A | 5/1994 | McCartney, Jr. | |
| 5,315,418 | A | 5/1994 | Sprague et al. | 359/41 |
| 5,334,996 | A | 8/1994 | Tanigaki et al. | 345/152 |
| 5,341,153 | A | 8/1994 | Benzschawel et al. | 345/152 |
| 5,398,066 | A | 3/1995 | Martinez-Uriegas et al. | 348/393 |
| 5,436,747 | A | 7/1995 | Suzuki | |
| 5,461,503 | A | 10/1995 | Deffontaines et al. | |
| 5,535,028 | A | 7/1996 | Bae et al. | |
| 5,541,653 | A | 7/1996 | Peters et al. | 348/264 |
| 5,561,460 | A | 10/1996 | Katoh et al. | 348/219 |
| 5,563,621 | A | 10/1996 | Silsby | |
| 5,579,027 | A | 11/1996 | Sakurai et al. | |
| 5,646,702 | A | 7/1997 | Akinwande et al. | |
| 5,648,793 | A | 7/1997 | Chen | 345/96 |
| 5,729,244 | A | 3/1998 | Lockwood | |
| 5,754,226 | A | 5/1998 | Yamada et al. | 348/219 |
| 5,773,927 | A | 6/1998 | Zimlich | |
| 5,792,579 | A | 8/1998 | Phillips | |
| 5,815,101 | A | 9/1998 | Fonte | |
| 5,821,913 | A | 10/1998 | Mamiya | |
| 5,856,050 | A | 1/1999 | Inoue et al. | |
| 5,936,596 | A * | 8/1999 | Yoshida et al. | 345/9 |
| 5,949,496 | A | 9/1999 | Kim | |
| 5,973,664 | A | 10/1999 | Badger | |
| 6,002,446 | A | 12/1999 | Eglit | |
| 6,005,692 | A | 12/1999 | Stahl | |
| 6,008,868 | A | 12/1999 | Silverbrook | 348/790 |
| 6,034,666 | A | 3/2000 | Kanai et al. | |
| 6,037,719 | A | 3/2000 | Yap et al. | |
| 6,038,031 | A | 3/2000 | Murphy | |
| 6,049,626 | A | 4/2000 | Kim | |
| 6,061,533 | A | 5/2000 | Kajiwara | |
| 6,064,363 | A | 5/2000 | Kwon | 345/98 |
| 6,072,272 | A | 6/2000 | Rumbaugh | |
| 6,097,367 | A | 8/2000 | Kuriwaki et al. | |
| 6,108,122 | A | 8/2000 | Ulrich et al. | |
| 6,144,352 | A | 11/2000 | Matsuda et al. | |
| 6,147,664 | A | 11/2000 | Hansen | |
| 6,151,001 | A | 11/2000 | Anderson et al. | |
| 6,160,535 | A | 12/2000 | Park | 345/153 |
| 6,184,903 | B1 | 2/2001 | Omori | |
| 6,188,385 | B1 | 2/2001 | Hill et al. | 345/136 |
| 6,198,507 | B1 | 3/2001 | Ishigami | |
| 6,219,025 | B1 | 4/2001 | Hill et al. | |
| 6,225,967 | B1 | 5/2001 | Hebiguchi | |
| 6,225,973 | B1 | 5/2001 | Hill et al. | |
| 6,236,390 | B1 | 5/2001 | Hitchcock | |
| 6,239,783 | B1 | 5/2001 | Hill et al. | |
| 6,243,055 | B1 * | 6/2001 | Fergason | 345/32 |
| 6,243,070 | B1 | 6/2001 | Hill et al. | |
| 6,262,710 | B1 | 7/2001 | Smith | |
| 6,271,891 | B1 | 8/2001 | Ogawa et al. | |
| 6,299,329 | B1 | 10/2001 | Mui et al. | |
| 6,326,981 | B1 * | 12/2001 | Mori et al. | 345/695 |
| 6,327,008 | B1 | 12/2001 | Fujiyoshi | |
| 6,346,972 | B1 | 2/2002 | Kim | |
| 6,360,023 | B1 | 3/2002 | Betrisey et al. | |
| 6,377,262 | B1 | 4/2002 | Hitchcock et al. | |
| 6,392,717 | B1 | 5/2002 | Kunzman | |
| 6,393,145 | B2 | 5/2002 | Betrisey et al. | |
| 6,429,867 | B1 | 8/2002 | Deering | |
| 6,441,867 | B1 | 8/2002 | Daly | |
| 6,453,067 | B1 | 9/2002 | Morgan et al. | |
| 6,466,618 | B1 | 10/2002 | Messing et al. | |
| 6,486,923 | B1 * | 11/2002 | Maeshima et al. | 348/649 |
| 6,600,495 | B1 | 7/2003 | Boland et al. | |
| 6,628,068 | B1 | 9/2003 | Rorison et al. | |
| 6,661,429 | B1 | 12/2003 | Phan | |
| 6,680,761 | B1 | 1/2004 | Greene et al. | |
| 6,738,526 | B1 | 5/2004 | Betrisey et al. | |
| 6,850,219 | B2 * | 2/2005 | Aoyama et al. | 345/103 |
| 6,903,754 | B2 | 6/2005 | Elliott | |
| 6,950,115 | B2 | 9/2005 | Elliott | |
| 7,274,383 | B1 | 9/2007 | Elliott | |
| 7,283,142 | B2 | 10/2007 | Credelle et al. | |
| 2001/0017515 | A1 | 8/2001 | Kusunoki et al. | |
| 2001/0040645 | A1 | 11/2001 | Yamazaki | |
| 2002/0012071 | A1 | 1/2002 | Sun | |
| 2002/0015110 | A1 | 2/2002 | Elliott | |
| 2002/0017645 | A1 | 2/2002 | Yamazaki et al. | |
| 2002/0050972 | A1 * | 5/2002 | Udo et al. | 345/96 |
| 2002/0122160 | A1 | 9/2002 | Kunzman | |
| 2002/0140831 | A1 | 10/2002 | Hayashi | |
| 2002/0190648 | A1 | 12/2002 | Bechtel et al. | |
| 2003/0011613 | A1 | 1/2003 | Booth, Jr. | |
| 2003/0043567 | A1 | 3/2003 | Hoelen et al. | |
| 2003/0071826 | A1 | 4/2003 | Goertzen | |
| 2003/0071943 | A1 | 4/2003 | Choo | |
| 2003/0090581 | A1 | 5/2003 | Credelle et al. | |
| 2003/0117423 | A1 | 6/2003 | Elliott | |
| 2003/0218618 | A1 | 11/2003 | Phan | |
| 2004/0046714 | A1 | 3/2004 | Elliott | |
| 2005/0248262 | A1 | 11/2005 | Elliott | |
| 2005/0264588 | A1 | 12/2005 | Elliott | |

FOREIGN PATENT DOCUMENTS

| | | | |
|---|---|---|---|
| DE | 299 09 537 | U1 | 10/1999 |
| DE | 199 23 527 | | 11/2000 |
| DE | 199 23 527 | A1 | 11/2000 |
| DE | 201 09 354 | U1 | 9/2001 |
| EP | 0 158 366 | A2 | 10/1985 |
| EP | 0 203 005 | A1 | 11/1986 |
| EP | 0 322 106 | A2 | 6/1989 |
| EP | 0 671 650 | | 9/1995 |
| EP | 0 793 214 | A1 | 9/1997 |
| EP | 0 812 114 | A1 | 12/1997 |
| EP | 0 878 969 | | 11/1998 |
| EP | 0 899 604 | A2 | 3/1999 |
| EP | 899 604 | A2 | 3/1999 |
| EP | 1 083 539 | A2 | 3/2001 |
| EP | 1 261 014 | A2 | 11/2002 |
| EP | 1 381 020 | A2 | 1/2004 |
| GB | 2 133 912 | A | 8/1984 |
| GB | 2 146 478 | A | 4/1985 |
| JP | 60-107022 | | 6/1985 |
| JP | 02-000826 | A | 1/1990 |
| JP | 03-78390 | | 4/1991 |
| JP | 03-036239 | B | 5/1991 |
| JP | 06-102503 | | 4/1994 |
| JP | 02-983027 | B2 | 11/1999 |
| JP | 2001203919 | | 7/2001 |
| WO | WO 97/23860 | | 7/1997 |

| | | | |
|---|---|---|---|
| WO | WO 00/21067 | | 4/2000 |
| WO | WO 00/42564 | | 7/2000 |
| WO | WO 00/42762 | | 7/2000 |
| WO | WO 00/45365 | | 8/2000 |
| WO | WO 00/65432 | | 11/2000 |
| WO | WO 00/67196 | | 11/2000 |
| WO | WO 01/10112 | A2 | 2/2001 |
| WO | WO 01/29817 | A1 | 4/2001 |
| WO | WO 01/52546 | A2 | 7/2001 |
| WO | WO 02/059685 | A2 | 8/2002 |
| WO | WO 03/014819 | A1 | 2/2003 |

OTHER PUBLICATIONS

"A New Flicker-Reduction Drive Method for High-Resolution LCTVs" Okumura el al.. pp. 551-554.

C. Elliott "Reducing Pixel Count without Reducing Image Quality", *Information Display*, vol. 15, pp. 22-25, Dec. 1999.

C. Elliott, "Active Matrix Display Layout Optimization for Sub-pixel Image Rendering", *IDMC 2000*, pp. 185-189, Aug. 2000.

H. Okumura, "A New Flicker-Reduction Drive Method for High-Resolution LCTVs", *SID '01 Digest*, pp. 551-554, 2001 (no month).

R. Martin at al., "Detectability of reduced blue pixel count in projection displays", Proceedings of the Society for Information Display Symposium Digest, pp. 606-609, May 1993.

Krantz, John H. et al., "Color Matrix Display Image Quality: The Effects of Luminance and Spatial Sampling," *SID International Symposium, Digest of Technical Papers*, 1990, pp. 29-32.

Messing, Dean S. et al., "Improved Display Resolution of Subsampled Colour Images Using Subpixel Addressing," *Proc. Int. Conf. Image Processing* (*ICIP '02*), Rochester, N.Y., IEEE Signal Processing Society, 2002, vol. 1, pp. 625-628.

Messing, Dean S. et al., "Subpixel Rendering on Non-Striped Colour Matrix Displays," *International Conference on Image Processing*, Barcelona, Spain, Sep. 2003, 4 pages.

"ClearType magnified," *Wired Magazine*, Nov. 8, 1999, Microsoft Typography, article posted Nov. 8. 1999, and last updated Jan. 27, 1999, © 1999 Microsoft Corporation, 1 page.

Credelle, Thomas L. et al., "P-00: MTF of High-Resolution PenTile Matrix™ Displays," *Eurodisplay 02 Digest*, 2002, pp. 1-4.

Daly, Scott, "Analysis of Subtriad Addressing Algorithms by Visual System Models," *SID Symp. Digest*, Jun. 2001, pp. 1200-1203.

Elliott, Candice H. Brown et al., "Color Subpixel Rendering Projectors and Flat Panel Displays," New Initiatives in Motion Imaging, SMPTE Advanced Motion Imaging Conference, Feb. 27-Mar. 1, 2003, Seattle, Washington, pp. 1-4.

Elliott, Candice H. Brown et al., "Co-optimization of Color AMLCD Subpixel Architecture and Rendering Algorithms," *SID Symp. Digest*, May 2002, pp. 172-175.

Feigenblatt, R.I., "Full-color imaging on amplitude-quantized color mosaic displays," *SPIE*, vol. 1075, Digital Image Processing Applications, 1989, pp. 199-204.

Johnston, Stuart J., "An Easy Read: Microsoft's ClearType," *InformationWeek Online*, Redmond, WA, Nov. 23, 1998, 3 pages.

Johnston, Stuart J., "Clarifying ClearType," *InformationWeek Online*, Redmond. WA, Jan. 4, 1999, 4 pages.

"Just Outta Beta," *Wired Magazine*, Dec. 1999, issue 7.12, 3 pages.

Klompenhouwer, Michiel A. et al., "Subpixel Image Scaling for Color Matrix Displays," *SID Symp. Digest*, May 2002, pp. 176-179.

Markoff, John, "Microsoft's Cleartype Sets Off Debate on Originality," *The New York Times*, Dec. 7, 1998, 5 pages.

"Microsoft ClearType," http://www.microsoft.com/opentype/cleartype, Sep. 26, 2002, 4 pages.

Platt, John C., "Optimal Filtering for Patterned Displays," Microsoft Research, *IEEE Signal Processing Letters*, 2000, 4 pages.

Platt, John, "Technical Overview of ClearType Filtering," Microsoft Research, http://research.microsoft.com/users/iplatt/cleartype/default.aspx, Sep. 17, 2002, 3 pages.

Poor, Alfred, "LCDs: The 800-pound Gorilla," *Information Display*, Sep. 2002, pp. 18-21.

"Ron Feigenblatt's remarks on Microsoft ClearType™," http://www.geocities.com/SiliconValley/Ridge/6664/ClearType.html, Dec. 5, 1998, Dec. 7, 1998, Dec. 12, 1999, Dec. 26, 1999, Dec. 30, 1999, and Jun. 19, 2000, 30 pages.

"Sub-Pixel Font Rendering Technology;" © 2003 Gibson Research Corporation, Laguna Hills, CA, 2 pages.

Werner, Ken, "OLEDs, OLEDs, Everywhere . . . ," *Information Display*, Sep. 2002, pp. 12-15.

Lee, Baek-woon at al., "40.5L: Late-News Paper: TFT-LCD with RGBW Color System," *SID 03 Digest*, 2003, pp. 1212-1215.

Adobe Systems, Inc., website, 2002, http://www.adobe.com/products/acrobat/cooltype.html.

Betrisey, C., et al., "Displaced Filtering for Patterned Displays," 2000, *Society for Information Display* (*SID*) *00 Digest*, pp. 296-299.

Carvajal, D., "Big Publishers Looking Into Digital Books," Apr. 3, 2000, *The New York Times*, Business/Financial Desk.

Elliott, C., "New Pixel Layout for PenTile Matrix," Jan. 2002, Proceedings of the International Display Manufacturing Conference, pp. 115-117.

Gibson Research Corporation, website, "Sub-Pixel Font Rendering Technology, How it Works," 2002, http://www.grc.com/ctwhat.html.

Microsoft Corporation, website, 2002, http://www.microsoft.com/reader/ppc/product/cleartype.html.

Microsoft Press Release, Nov. 15, 1998. Microsoft Research Announces Screen Display Breakthrough at COMDEX/Fall '98, PR Newswire.

Murch, M., "Visual Perception Basics," 1987, *SID*, Seminar 2, Tektronix, Inc., Beaverton, Oregon.

Wandell, Brian A., Stanford University, "Fundamentals of Vision: Behavior, Neuroscience and Computation," Jun. 12, 1994, *Society for Information Display* (*SID*) *Short Course S-2*, Fairmont Hotel, San Jose, California.

C. Elliott, "Reducing Pixel Count Without Reducing Image Quality", Information Display, vol. 15, pp. 22-25, Dec. 1999.

C. Elliott, "Active Matrix Display Layout Optimization for Sub-Pixel Image Rendering", IDMC 2000, pp. 185-189, Aug. 2000.

Krantz, John et al., Color Matrix Display Image Quality: The Effects of Luminance and Spatial Sampling, SID 90 Digest, pp. 29-32.

Lee, Baek-woon et al., "40.5L: Late-News Paper: TFT-LCD with RGBW Color System," SID 03 Digest, 2003, pp. 1212-1215.

Messing, Dean et al., Improved Display Resolution of Subsampled Colour Images Using Subpixel Addressing, IEEE ICIP 2002.

Messing, Dean et al., Subpixel Rendering on Non-Striped Colour Mtrix Displays, 2003 International Conf on Image Processing, Sep. 2003, Barcelona Spain.

H. Okamura, "A New Flicker-Reduction Drive Method for High-Resolution LCTV's", SID 01 Digest, pp. 551-554, 2001 (no month).

Brown Elliott, C, "Development of the PenTile Matrix™ Color AMLCD Subpixel Architecture and Rendering Algorithms", SID 2003, Journal Article.

PCT International Search Report dated Apr. 4, 2002 for PCT/US01/23895 (U.S. Appl. No. 09/916,232).

PCT International Search Report dated Aug. 21, 2002 for PCT/US02/14925 (U.S. Appl. No. 10/024,326).

PCT International Search Report dated Jul. 17, 2003 for PCT/US02/39859 (U.S. Appl. No. 10/278,393).

PCT International Search Report dated Jul. 30, 2003 for PCT/US02/39860 (U.S. Appl. No. 10/278,328).

USPTO, Non-Final Office Action, dated Mar. 18, 2003 in US Patent No. 7,274,383(U.S. Appl. No. 09/628,122).

Clairvoyante Inc., Response to Non-Final Office Action, dated Jul. 18, 2003 in US Patent No. 7,274,383(U.S. Appl. No. 09/628,122).

USPTO, Final Office Action, dated Oct. 3, 2003 in US Patent No. 7,274,383(U.S. Appl. No. 09/628,122).

Clairvoyante Inc., Response to Final Office Action, dated Jan. 16, 2004 in US Patent No. 7,274,383(U.S. Appl. No. 09/628,122).

USPTO, Non-Final Office Action, dated Apr. 19, 2004 in US Patent No. 7,274,383(U.S. Appl. No. 09/628,122).

Clairvoyante Inc., Response to Non-Final Office Action, dated Aug. 5, 2004 in US Patent No. 7,274,383(U.S. Appl. No. 09/628,122).

USPTO, Non-Final Office Action, dated Jan. 11, 2005 in US Patent No. 7,274,383(U.S. Appl. No. 09/628,122).

USPTO, Final Office Action, dated Jan. 28, 2005 in US Patent No. 7,274,383(U.S. Appl. No. 09/628,122).
Clairvoyante Inc., Response to Final Office Action, dated Jan. 31, 2005 in US Patent No. 7,274,383(U.S. Appl. No. 09/628,122).
USPTO, Non-Final Office Action, dated Feb. 10, 2006 in US Patent No. 7,274,383(U.S. Appl. No. 09/628,122).
Clairvoyante Inc., Response to Non-Final Office Action, dated Jul. 1, 2006 in US Patent No. 7,274,383(U.S. Appl. No. 09/628,122).
USPTO, Final Office Action, dated Sep. 20, 2006 in US Patent No. 7,274,383(U.S. Appl. No. 09/628,122).
Clairvoyante Inc., Response to Final Office Action, dated Mar. 19, 2007 in US Patent No. 7,274,383(U.S. Appl. No. 09/628,122).
USPTO, Notice of Allowance, dated Apr. 9, 2007 in US Patent No. 7,274,383 (U.S. Appl. No. 09/628,122).
USPTO, Non-Final Office Action, dated Dec. 11, 2007 in US Patent Publication No. 2005/0248262, (U.S. Appl. No. 11/182,147).
USPTO, Non-Final Office Action, dated Mar. 9, 2004 in US Patent No. 6,903,754 (U.S. Appl. No. 09/916,232).
USPTO, Non-Final Office Action, dated May 6, 2004 in US Patent No. 6,903,754 (U.S. Appl. No. 09/916,232).
Clairvoyante Inc., Response to Non-Final Office Action, dated Sep. 3, 2004 in US Patent No. 6,903,754 (U.S. Appl. No. 09/916,232).
USPTO, Final Office Action, dated Jan. 6, 2005 in US Patent No. 6,903,754 (U.S. Appl. No. 09/916,232).
Clairvoyante Inc., Response to Final Office Action, dated Jan. 28, 2005 in US Patent No. 6,903,754 (U.S. Appl. No. 09/916,232).
USPTO, Notice of Allowance, dated Feb. 7, 2005 in US Patent No. 6,903,754 (U.S. Appl. No. 09/916,232).
USPTO, Non-Final Office Action, dated Jan. 15, 2004 in US Patent No. 6,950,115 (U.S. Appl. No. 10/024,326).
Clairvoyante Inc., Response to Non-Final Office Action, dated May 10, 2004 in US Patent No. 6,950,115 (U.S. Appl. No. 10/024,326).
USPTO, Non-Final Office Action, dated Jun. 28, 2004 in US Patent No. 6,950,115 (U.S. Appl. No. 10/024,326).
Clairvoyante Inc., Response to Non-Final Office Action, dated Oct. 27, 2004 in US Patent No. 6,950,115 (U.S. Appl. No. 10/024,326).
USPTO, Notice of Allowance, dated Jun. 1, 2005 in US Patent No. 6,950,115 (U.S. Appl. No. 10/024,326).
USPTO, Non-Final Office Action, dated Jul. 28, 2005 in US Patent No. 7,283,142, (U.S. Appl. No. 10/278,393).
Clairvoyante Inc, Response to Non-Final Office Action, dated Jan. 30, 2006 in US Patent No. 7,283,142, (U.S. Appl. No. 10/278,393).
USPTO, Final Office Action, dated Apr. 18, 2006 in US Patent No. 7,283,142, (U.S. Appl. No. 10/278,393).
Clairvoyante Inc, Response to Non-Final Office Action, dated Sep. 18, 2006 in US Patent No. 7,283,142, (U.S. Appl. No. 10/278,393).
USPTO, Non-Final Office Action, dated Nov. 14, 2006 in US Patent No. 7,283,142, (U.S. Appl. No. 10/278,393).
Clairvoyante Inc, Response to Non-Final Office Action, dated May 14, 2007 in US Patent No. 7,283,142, (U.S. Appl. No. 10/278,393).
USPTO, Notice of Allowance, dated Jul. 17, 2007 in US Patent No. 7,283,142, (U.S. Appl. No. 10/278,393).
USPTO, Non-Final Office Action, dated May 4, 2005 in US Patent Publication No. 2003/0117423, (U.S. Appl. No. 10/278,328).
Clairvoyante Inc, Response to Non-Final Office Action, dated Nov. 3, 2005 in US Patent Publication No. 2003/0117423, (U.S. Appl. No. 10/278,328).
USPTO, Final Office Action, dated Feb. 17, 2006 in US Patent Publication No. 2003/0117423, (U.S. Appl. No. 10/278,328).
USPTO, Interview Summary, dated Mar. 17, 2006 in US Patent Publication No. 2003/0117423, (U.S. Appl. No. 10/278,328).
Clairvoyante Inc, Response to Final Office Action, dated Aug. 16, 2006 in US Patent Publication No. 2003/0117423, (U.S. Appl. No. 10/278,328).
USPTO, Non-Final Office Action, dated Nov. 15, 2006 in US Patent Publication No. 2003/0117423, (U.S. Appl. No. 10/278,328).
MKCH, Response to Non-Final Office Action, dated May 12, 2008 in US Patent Publication No. 2005/0248262, (U.S. Appl. No. 11/182,147).
USPTO, Final Office Action, dated Aug. 20, 2008 in US Patent Publication No. 2005/0248262, (U.S. Appl. No. 11/182,147).
MKCH, Response to Non-Final Office Action, dated Oct. 20, 2008 in US Patent Publication No. 2005/0248262, (U.S. Appl. No. 11/182,147).
USPTO, Non-Final Office Action, dated May 6, 2008 in US Patent Publication No. 2005/0264588 (U.S. Appl. No. 11/182,308).
MKCH, Response to Non-Final Office Action, dated Jul. 17, 2008 in US Patent Publication No. 2005/0264588 (U.S. Appl. No. 11/182,308).
USPTO, Final Office Action, dated Sep. 11, 2008 in US Patent Publication No. 2005/0264588 (U.S. Appl. No. 11/182,308).

* cited by examiner

ARRANGEMENTS OF COLOR PIXELS FOR FULL COLOR IMAGING DEVICES WITH SIMPLIFIED ADDRESSING

RELATED APPLICATIONS

The present application is a continuation of Ser. No. 09/916,232 filed Jul. 25, 2001, now issued as U.S. Pat. No. 6,903,754, which is a continuation-in-part to U.S. patent application Ser. No. 09/628,122, entitled "Arrangement of Color Pixels for Full Color Imaging Devices with Simplified Addressing", filed on Jul. 28, 2000 and issued as U.S. Pat. No. 7,274,383, all of which are herein incorporated by reference.

BACKGROUND

The present application relates to color pixel arrangements, and specifically to color pixel arrangements used in electronic imaging devices and displays.

Full color perception is produced in the eye by three-color receptor nerve cell types called cones. The three types are sensitive to different wavelengths of light: long, medium, and short ("red", "green", and "blue", respectively). The relative density of the three differs significantly from one another. There are slightly more red receptors than green receptors. There are very few blue receptors compared to red or green receptors. In addition to the color receptors, there are relative wavelength insensitive receptors called rods that contribute to monochrome night vision.

The human vision system processes the information detected by the eye in several perceptual channels: luminance, chromanance, and motion. Motion is only important for flicker threshold to the imaging system designer. The luminance channel takes the input from all of the available receptors, cones and rods. It is "color blind". It processes the information in such a manner that the contrast of edges is enhanced. The chromanance channel does not have edge contrast enhancement. Since the luminance channel uses and enhances every receptor, the resolution of the luminance channel is several times higher than the chromanance channel. The blue receptor contribution to luminance perception is less than 5%, or one part in twenty. Thus, the error introduced by lowering the blue resolution by one octave will be barely noticeable by the most perceptive viewer, if at all, as experiments at NASA, Ames Research Center (R. Martin, J. Gille, J. Larimer, Detectability of Reduced Blue Pixel Count in Projection Displays, SID Digest 1993) have demonstrated.

Color perception is influenced by a process called "assimilation", or the Von Bezold color blending effect. This is what allows separate color pixels (or sub-pixels or emitters) of a display to be perceived as the mixed color. This blending effect happens over a given angular distance in the field of view. Because of the relatively scarce blue receptors, this blending happens over a greater angle for blue than for red or green. This distance is approximately 0.25.degree. for blue, while for red or green it is approximately 0.12.degree. At a viewing distance of twelve inches, 0.25.degree. subtends 50 mils (1,270.mu.) on a display. Thus, if the blue pixel pitch is less than half (625.mu.) of this blending pitch, the colors will blend without loss of picture quality.

The present state of the art of color single plane imaging matrix, for flat panel displays and solid state camera chips is the (red-green-blue) RGB color triad. The system takes advantage of the Von Bezold effect by separating the three colors and placing equal spatial frequency weight on each color. Two manufacturers have shown improvements in display design by using dual or triple panels whose images are superimposed. One manufacturer of projection displays used three panels, red, green, and blue. The blue panel utilizes reduced resolution in accordance with the match between human vision requirements and the displayed image. Another manufacturer, Planar Systems of Beaverton, Oreg. employs a "Multi-row Addressing" technique having a dual electroluminescent panel, one panel with red and green pixels, the other with blue pixels to build a developmental model. The blue pixels have reduced resolution in the vertical axis only. This allows the blue phosphors to be excited at a higher rate than the red and green pixels, thus overcoming a problem with lower blue phosphor brightness. The problem with the prior art is that in providing the same matched resolution balance between human vision and display, additional display panels/planes are used, along with additional driver electronics.

Other display methods such as disclosed in U.S. Pat. No. 6,008,868 to Silverbrook use binary controlled emitters. In using binary controlled emitters, each emitter has a discrete luminance value, therefore, requiring the display to have an exact area to luminance relationship. This prior art used reduced blue "bit depth" built into the panel in accordance with human vision's lower blue color space increments. Conventional display methods also use a single color in a vertical stripe. Since conventional stripes have limited the Modulation Transfer Function (MTF), high spatial frequency resolution, in the horizontal axis, stripes of a single color are non-optimal.

Display devices can include liquid crystal display (LCD) devices. LCD devices have been used in a variety of applications, including calculators, watches, color televisions, and computer monitors. A conventional liquid crystal panel typically includes a pair of transparent glass substrates that are arranged in parallel to define a narrow gap therebetween that is filled with a liquid crystal material. A plurality of pixel electrodes typically are disposed in a matrix on an inner surface of one of the transparent glass substrates, and a plurality of common electrodes corresponding to the pixel electrodes are arranged on the inner surface of the other substrate of the two transparent glass substrates. A liquid crystal cell is defined by opposing pixel electrodes and common electrodes. Images are displayed by controlling light transmission through the cell according to a voltage applied to the electrode pair.

In a conventional active matrix LCD device, a plurality of row lines are formed on one substrate, transverse to a plurality of column lines. A plurality of pixel electrodes are disposed on a corresponding plurality of pixels regions defined by the row and column lines. A respective thin-film transistor (TFT) is formed on a respective one of the pixel regions, and drives the pixel electrode formed thereon.

Repeatedly driving a liquid crystal cell with voltages having the same polarity can cause an electrochemical change in the pixel electrode and the common electrode due to migration of ionic impurities within the liquid crystal material. This change can significantly reduce display sensitivity and brightness. Accordingly, it is generally desirable to repeatedly invert the polarity of the voltage applied to the liquid crystal cell in order to prevent this phenomenon. This method of driving a liquid crystal cell is known as "inversion". There are several inversion schemes that are known in the art, including "frame inversion", "column inversion", "line (or row) inversion", or "dot inversion".

A conventional dot inversion driving technique involves applying column line voltages that have different polarities to adjacent sub-pixel electrodes, for example, by driving alternating pixel elements with negative and positive voltages. Typically, the polarity of the driving voltage applied to a given pixel electrode is inverted each time the voltage is applied. The applied voltage is stored on the sub-pixel, row by row, alternating with each row. The result is a "checker board" pattern of polarities on the two dimensional matrix of sub-pixels.

Although the above-mentioned conventional dot-inversion driving technique is useful to prevent ion migration in the liquid crystal material and lowering perceived "flicker" in the display, special care must be taken when applying "dot inversion" to the novel arrangement of the three-color pixel elements, and its associated drive structure to avoid this "flicker".

SUMMARY

The drawbacks and disadvantages of the prior art are overcome by the arrangement of color pixels for full color imaging devices with simplified addressing.

An array and row and column line architecture for a display is disclosed. The array consists of a plurality of row and column positions and a plurality of three-color pixel elements. Each three-color pixel element can comprise a blue emitter, a pair of red emitters, and a pair of green emitters. Several designs for the three-color pixel element are contemplated. The drive matrix consists of a plurality of row and column drivers to drive the individual emitters. The row drivers drive the red, green and blue emitters in each row. The red and green emitters in each column are driven by a single column driver. However, a single column driver can drive two column lines of blue emitters, a first column line and a second column line of the next nearest neighboring three-color pixel element. Thus, the number of column lines and associated driver electronics, as used in the prior art, are reduced in the present invention.

A drive matrix for an array of three-color pixel elements is also disclosed. While the array consists of a plurality of rows and columns of each three-color pixel element of the present invention, the drive matrix consists of a plurality of row and column drivers to drive the individual emitters. The row drivers drive the red, green and blue emitters in each row. The red and green emitters in each column are driven by a single column driver. However, a single column driver can drive two column lines of blue emitters, a first column line and a second column line of the next nearest neighboring three-color pixel element. Thus, also reducing the number of column lines and associated driver electronics.

Methods of driving a three-color pixel element in a display are disclosed. The method comprises providing a three-color pixel element having any of several contemplated designs. The blue emitter, the red emitters, and the green emitters are driven, such that the blue emitter of the three-color pixel element is coupled to a blue emitter of a next nearest neighboring three-color pixel element.

BRIEF DESCRIPTION OF THE DRAWINGS

Referring now to the figures, wherein like elements are numbered alike.

DETAILED DESCRIPTION

Those of ordinary skill in the art will realize that the following description of the present invention is illustrative only and not in any way limiting. Other embodiments of the invention will readily suggest themselves to such skilled persons.

The arrangement of three-color pixel elements influences the effect of the blending of the colors of the pixels. Each three-color pixel element comprises at least a blue emitter, a red emitter, and a green emitter and can be group in several different designs. A plurality of row drivers and column (or column line) drivers are operated to drive the individual emitters. The row drivers drive the red, green and blue emitters in each row. The red and green emitters in each column are driven by a single column driver. However, reduction of the number of column drivers can be achieved by using a single column driver to drive two column lines of blue emitters, a first column line and a second column line of the next nearest neighboring three-color pixel element. This arrangement aids in the driving of the display device, especially liquid crystal display devices, by dot inversion methods.

Figure 1:
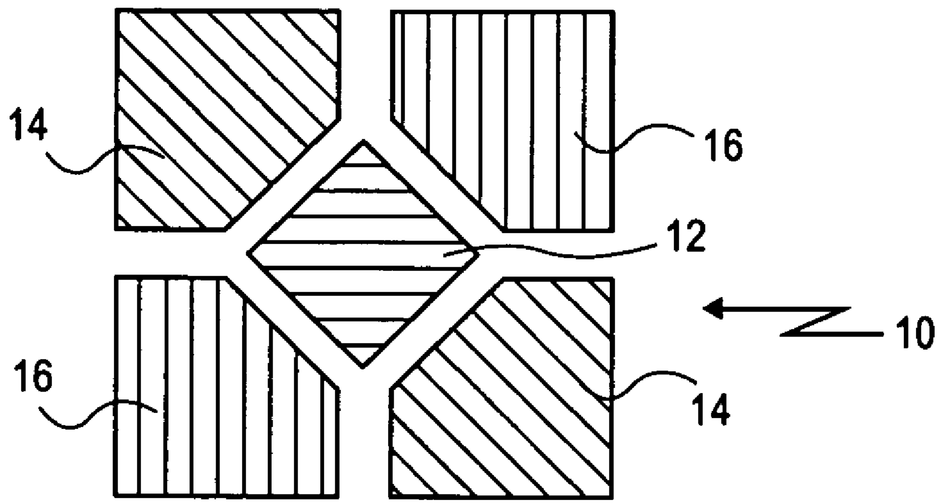
FIG. 1 is an arrangement of a three-color pixel element.

FIG. 1 shows an illustrative embodiment of an arrangement of a three-color pixel element 10. The three-color pixel element consists of a blue emitter 12, two red emitters 14, and two green emitters 16. The three-color pixel element 10 is square shaped and is centered at the origin of an X, Y coordinate system. The blue emitter 12 is centered at the origin of the square and extends into the first, second, third, and fourth quadrants of the X, Y coordinate system. A pair of red emitters 14 are disposed in opposing quadrants (i.e., the second and the fourth quadrants), and a pair of green emitters 16 are disposed in opposing quadrants (i.e., the first and the third quadrants), occupying the portions of the quadrants not occupied by the blue emitter 12. As shown in FIG. 1, the blue emitter 12 is square shaped, having corners aligned at the X and Y axes of the coordinate system, and the opposing pairs of red 14 and green 16 emitters are generally square shaped, having truncated inwardly-facing corners forming edges parallel to the sides of the blue emitter 12.

Figure 2:
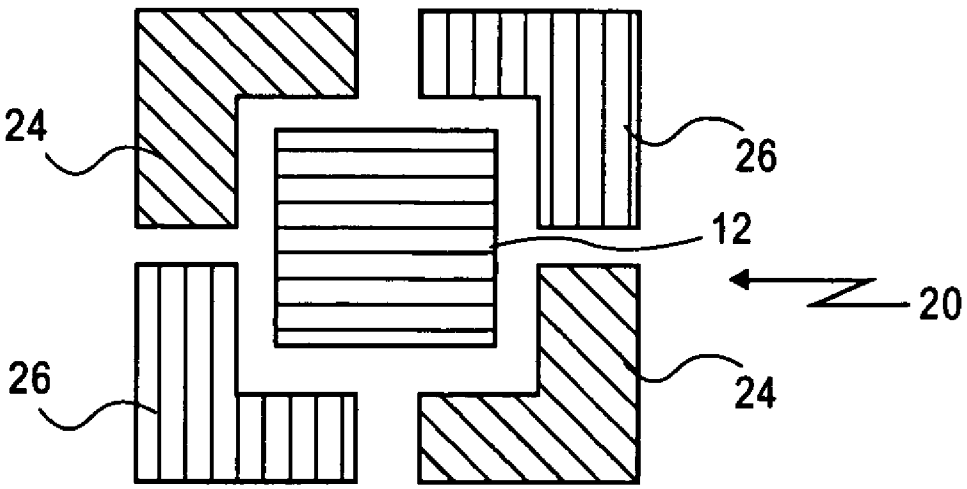
FIG. 2 is another arrangement of a three-color pixel element.

Another illustrative embodiment of a three-color pixel element 20 is shown in FIG. 2. In this embodiment, the three-color pixel element 20 is also square shaped and is centered at the origin of an X, Y coordinate system, extending into the first, second, third, and fourth quadrants of the X, Y coordinate system. The blue emitter 22 is centered at the origin of the square and is square shaped having sides aligned parallel to the X and Y axes of the coordinate system. A pair of red emitters 24 are disposed in opposing quadrants (i.e., the second and the fourth quadrants), and a pair of green emitters 26 are disposed in opposing quadrants (i.e., the first and the third quadrants), occupying the portions of the quadrants not occupied by the blue emitter 22. In this embodiment, the opposing pairs of red emitters 24 and green emitters 26 are L-shaped. The L-shaped emitters envelop the blue emitter having the inside corners of the L-shaped emitters aligned with the corners of the blue emitter.

According to a preferred embodiment, the three-color pixel element has equal red, green and blue emitter areas. This may be achieved by placing in the center of the three-color pixel element a blue emitter having an area larger than the areas of the individual red and green emitters. Those of ordinary skill in the art will recognize that, in other embodiments, the area of the blue emitter may be smaller in relation to either the red or green emitters. The blue emitter can be brighter than either the red or green emitters can, or it can be the same brightness as the red and green emitters can. For example, the drive-to-luminance gain of the blue emitter may be greater than that of the red or green emitters.

Although the above description is illustrative of a preferred embodiment, those of ordinary skill in the art will readily recognize other alternatives. For example, the emitters may have different shapes, such as rounded or polygonal. They may also be diffuse rather than having sharp edges. The three-color pixel elements need not be arranged with equal spatial frequency in each axis. The aperture ratio between the emitters may be minimized to substantially non-existent or it may be very pronounced, and the space may also be different colors, including black or white. The emitters may be any technology known or invented in the future, such as displays using Liquid Crystal (LCD), Plasma, Thin Film Electroluminescent, Discrete Light Emitting Diode (LED), Polymer Light Emitting Diode, Electro-Chromic, Electro-Mechanical, Incandescent Bulb, or Field Emission excited phosphor (FED).

Figure 3:
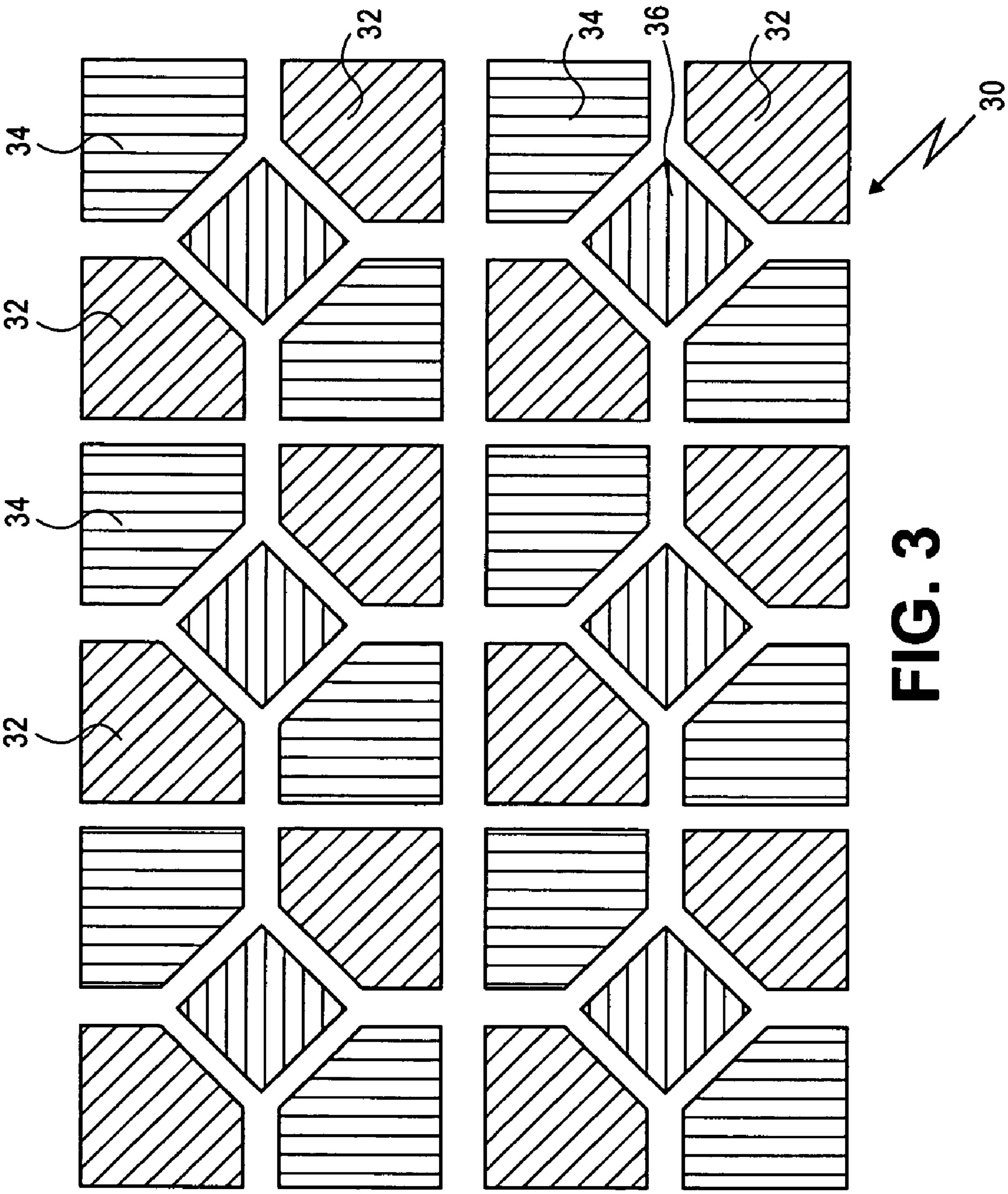
FIG. 3 is an array of three-color pixel elements.

FIG. 3 is an array 30 of the three-color pixel elements 10 of FIG. 1. The array 30 is repeated across a panel or chip to complete a device with a desired matrix resolution. The repeating three-color pixel elements 10 form a "checker board" of alternating red 32 and green 34 emitters with blue emitters 36 distributed evenly across the device, but at half the resolution of the red 32 and green 34 emitters.

One advantage of the three-color pixel element array is improved resolution of color displays. This occurs since only the red and green emitters contribute significantly to the perception of high resolution in the luminance channel. Thus, reducing the number of blue emitters and replacing some with red and green emitters improves resolution by more closely matching human vision.

Dividing the red and green emitters in half in the vertical axis to increase spatial addressability is an improvement over the conventional vertical single color stripe of the prior art. An alternating "checkerboard" of red and green emitters allows the Modulation Transfer Function (MTF), high spatial frequency resolution, to increase in both the horizontal and the vertical axes.

The three-color pixel element array may also be used in solid state image capture devices found in modern consumer video cameras and electronic still cameras. An advantage of using the reduced blue emitter resolution in both image capture and display is that stored images do not need to supply the same resolution for each color in storage or processing. This presents potential savings during coding, compression, and decompression of electronically stored images, including software and hardware in electronic imaging and display systems such as computers, video games, and television, including High Definition Television (HDTV) recording, playback, broadcasting, and display.

Figure 4:
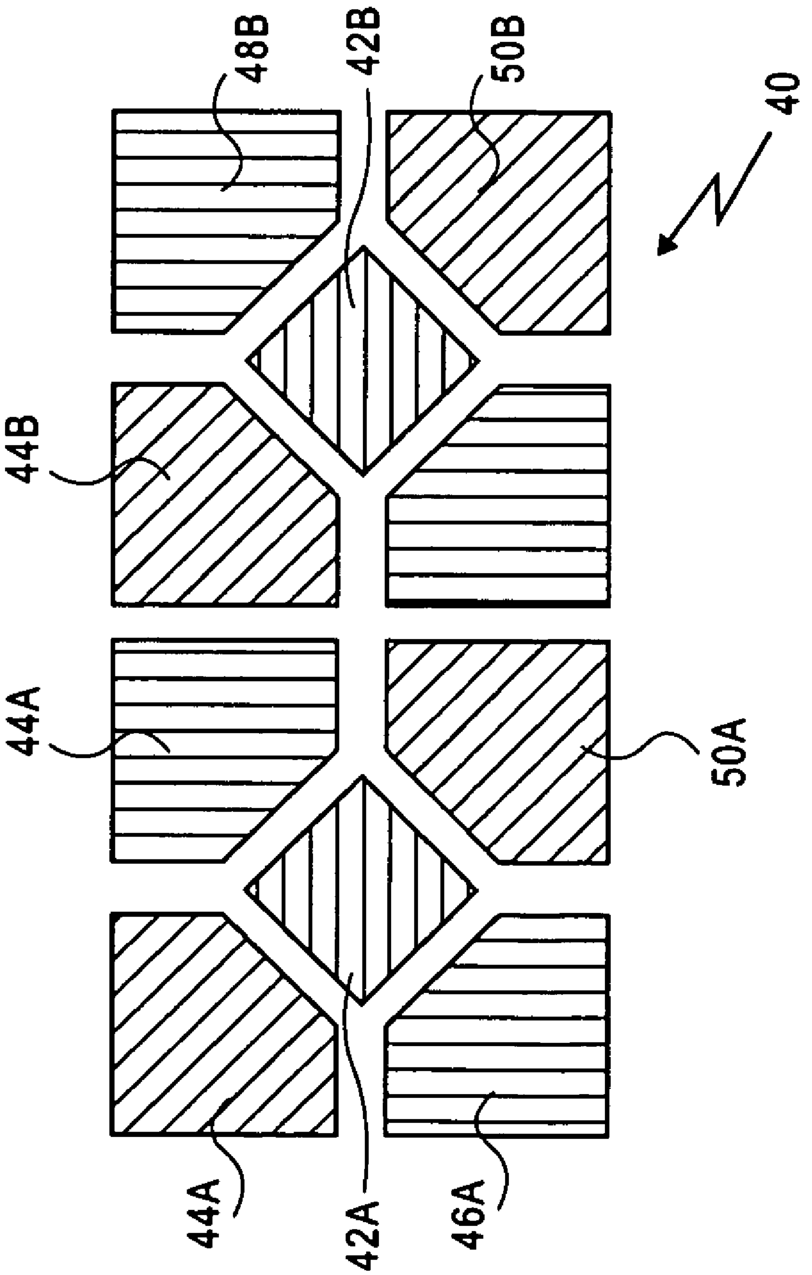
FIG. 4 is an arrangement of two three-color pixel elements, aligned horizontally.

FIG. 4 is an arrangement 40 of two three-color pixel elements aligned horizontally. The three-color pixel elements are square-shaped and each is centered at each origin of an X, Y coordinate system. The blue emitter **42*a* is centered at the origin of the square of the first three-color pixel element and extends into the first, second, third, and fourth quadrants of its X, Y coordinate system. Blue emitter 42*b* is centered at the origin of the square of the second three-color pixel element and extends into the first, second, third, and fourth quadrants of its X, Y coordinate system. Red emitters 44*a* and 44*b* are disposed in the second quadrants of the first and second pixel elements, respectively. Green emitters 46*a* and 46*b* are disposed in the third quadrants of the first pixel and second pixel elements, respectively. Green emitters 48*a* and 48*b* are disposed in the first quadrant of the first pixel and second pixel elements. Red emitters 50*a* and 50*b* are disposed in the fourth quadrants of the first pixel and second pixel elements, respectively. As shown in FIG. 4, each blue emitter (e.g., 42*a*) is square-shaped having corners aligned at the X and Y axes of each coordinate system. The opposing pairs of red emitters (e.g., 44*a* and 50*a*) and green emitters (e.g., 48*a* and 46*a*) are generally square shaped, having truncated inwardly-facing corners forming edges parallel to the sides of the blue emitter (e.g., 42*a***). In each three-color pixel element, the red and green emitters occupy the portion of the quadrant not occupied by the blue emitter.

Figure 5:
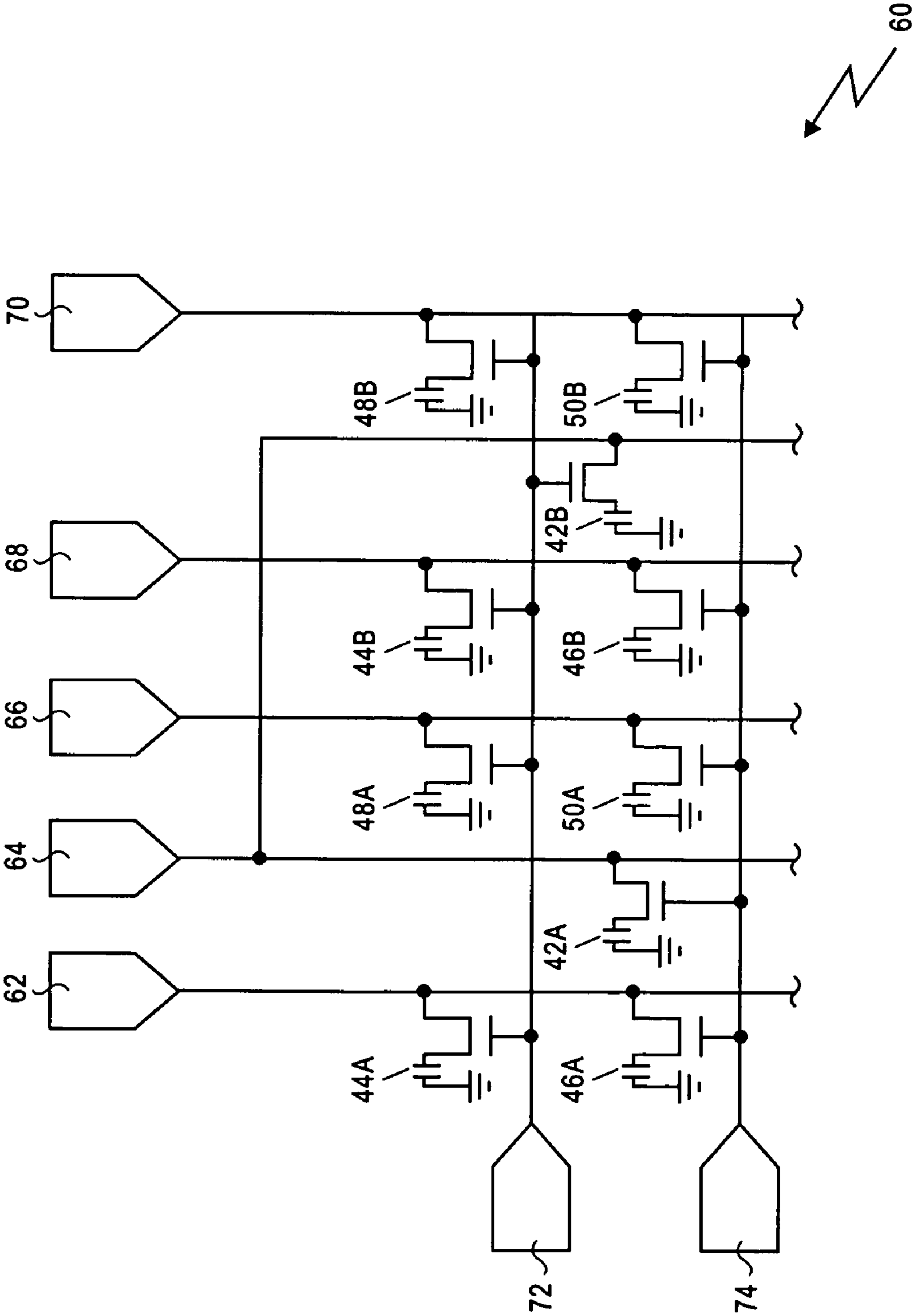
FIG. 5 is a diagram showing an illustrative drive matrix for the pixel arrangement of FIG. 4.

FIG. 5 is a diagram of an illustrative drive matrix 60 for the three-color pixel element arrangement 40. The liquid crystal display emitters are schematically represented as capacitors for convenience. Each liquid crystal display emitter is coupled to the row and column lines through a select transistor, as in FIG. 5 with red emitter **44*a***. The liquid crystal display emitters are coupled through the gate of the select transistor to the row line. The column line is coupled to the first source/drain terminal of the select transistor and the second source/drain terminal of the select transistor, which is coupled to the liquid crystal display emitter. A fixed potential is coupled to the liquid crystal display emitter. The liquid crystal display emitters of the invention may be active electronic devices such as Thin Film Transistors (TFT) found in Active Matrix Liquid Crystal Display (AMLCD), or Charge Coupled Devices (CCD) as found in camera chips, or other suitable devices.

The illustrative drive matrix 60 shown in FIG. 5 consists of a 2×5 drive matrix, where four column drivers drive the red and green emitters coupled to column lines and a single column driver drives the blue emitters coupled to column lines. A first column driver 62 drives the red emitter **44*a* and the green emitter 46*a*. The blue emitters 42*a* and 42*b* are tied together and driven by a second column driver 64. A third column driver 66 drives the green emitter 48*a* and the red emitter 50*a*, while a fourth column driver 68 drives the red emitter 44***b* and the green emitter 46*b*. The green emitter 48*b* and the red emitter 50*b* are driven by a fifth column driver 70. Alternative embodiments, using at least four three-color pixel elements with two row drivers and ten column drivers, are presented further herein.

The row drivers drive the red, green and blue emitters in each row. Row driver 72 drives red emitters 44*a* and 44*b*, green emitters 48*a* and 48*b*, as well as blue emitter 42*b*. Row driver 74 drives green emitters 46*a* and 46*b*, red emitters 50*a* and 50*b* and blue emitter 42*a*. Each emitter can be driven at continuous luminance values at specific locations in a pixel element, unlike emitters in the prior art, which are driven at discrete luminance values at random locations in a three color pixel element.

The drive matrix uses approximately 16% fewer column drivers to present a given image than does a prior art 2×6-drive matrix for the triad arrangement. The column lines are reduced since the blue emitters 12 are combined. This entire arrangement can be turned 90 degrees such that the combined blue emitters 12 are driven by the same row driver. All such topologically identical variants known in the art are possible embodiments. In addition, the driver type, voltage, and timing can be the same as already known in the art for each device technology.

Figure 6:
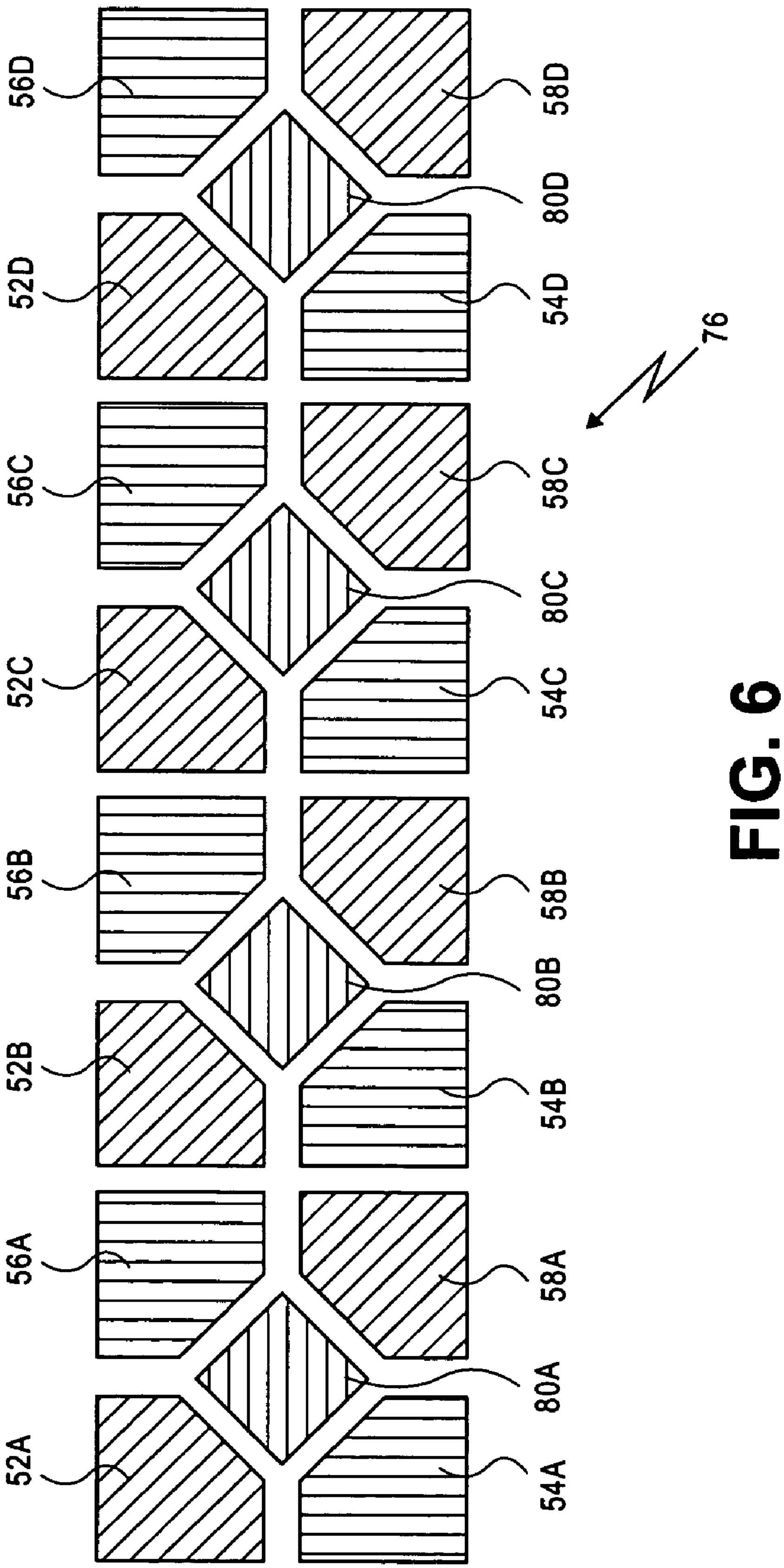
FIG. 6 is an arrangement of four three-color pixel elements, aligned horizontally.
Figure 7:
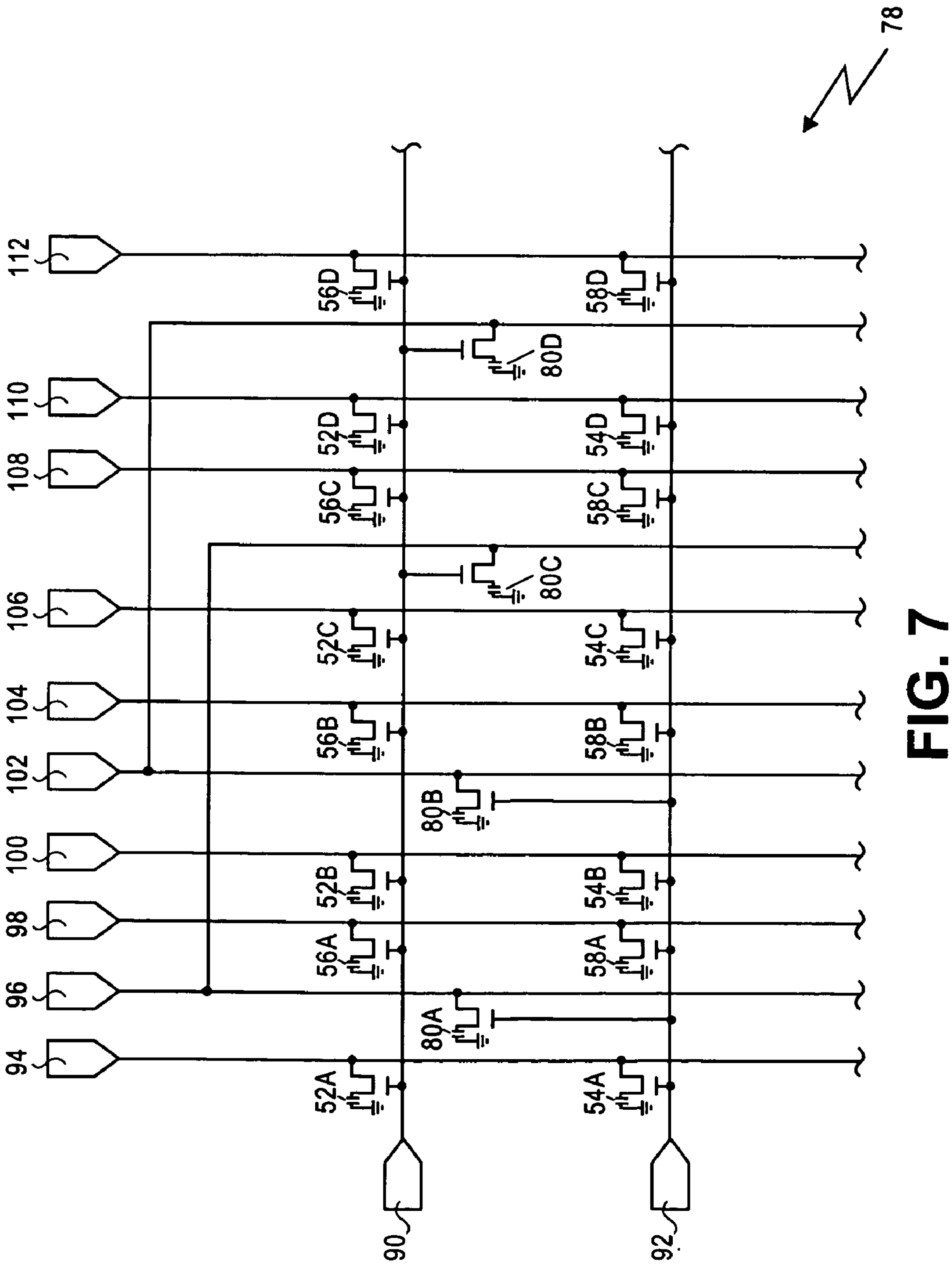
FIG. 7 is a diagram showing an illustrative drive matrix for the pixel arrangement of FIG. 6.

An alternative embodiment of an arrangement and drive matrix is illustrated in FIGS. 6 and 7. FIG. 6 is an arrangement 76 of four three-color pixel elements aligned horizontally. Each three-color pixel element is square-shaped and each is centered at each origin of an X, Y coordinate system. In this case, the blue emitters 80*a*, 80*b*, 80*c*, and 80*d* are centered at the origin of the square of each of the three-color pixel elements. The blue emitters 80*a*, 80*b*, 80*c*, and 80*d* extend into the first, second, third, and fourth quadrants of each X, Y coordinate system. Red emitters 52*a*, 52*b*, 52*c*, and 52*d* are disposed in the second quadrants of the first, second, third, and fourth three-color pixel elements, respectively. Green emitters 54*a*, 54*b*, 54*c*, and 54*d* are disposed in the third quadrants of the first, second, third, and fourth three-color pixel elements, respectively. Green emitters 56*a*, 56*b*, 56*c*, and 56*d* are disposed in the first quadrants of the first, second, third, and fourth three-color pixel elements, respectively. Red emitters 58*a*, 58*b*, 58*c*, and 58*d* are disposed in the fourth quadrants of the first, second, third, and fourth three-color pixel elements, respectively. As shown in FIG. 6, each blue emitter (e.g., 80*a*) is square-shaped, having corners aligned at the X and Y axes of each coordinate system. The opposing pairs of red emitters (e.g., 52*a* and 58*a*) and green emitters (e.g., 54*a* and 56*a*) are generally square shaped, having truncated inwardly-facing corners forming edges parallel to the sides of the blue emitter (e.g., 80*a*). In each three-color pixel element, the red and green emitters occupy the portion of the quadrant not occupied by the blue emitter.

FIG. 7 is a diagram of an illustrative drive matrix 78 for the arrangement 76. The illustrative drive matrix 78 shown in FIG. 7 consists of a 2×10 drive matrix, where eight column drivers drive the eight red and eight green emitters coupled to column lines and two column drivers drive the four blue emitters coupled to column lines. A first column driver 94 drives the red emitter 52*a* and the green emitter 54*a*. The blue emitters 80*a* and 80*c* are tied together and driven by a second column driver 96. A third column driver 98 drives the green emitter 56*a* and the red emitter 58*a*, while a fourth column driver 100 drives the red emitter 52*b* and the green emitter 54*b*. A fifth column driver 102 drives the blue emitter 80*b*, which is tied together with 80*d*. The green emitter 56*b* and the red emitter 58*b* are driven by a sixth column driver 104, while a seventh column driver 106 drives red emitter 52*c* and green emitter 54*c*. An eighth column driver 108 drives green emitter 56*c* and red emitter 58*c*, while a ninth column driver 110 drives red emitter 52*d* and green emitter 54*d*. Finally, a tenth column driver 112 drives green emitter 56*d* and red emitter 58*d*.

The row drivers drive the red, green and blue emitters in each pixel row. Row driver 90 drives red emitters 52*a*, 52*b*, 52*c*, and 52*d*, green emitters 56*a*, 56*b*, 56*c*, and 56*d*, as well as blue emitters 80*c* and 80*d*. Row driver 92 drives green emitters 54*a*, 54*b*, 54*c*, and 54*d*, red emitters 58*a*, 58*b*, 58*c*, and 58*d*, and blue emitters 80*a* and 80*b*. Each emitter can be driven at continuous luminance values at specific locations in a pixel element, unlike emitters in the prior art, which are driven at discrete luminance values at random locations in a three color pixel element.

The drive matrix uses approximately 16.6% fewer column drivers to present a given image than does a prior art 2×12-drive matrix for the triad arrangement. The column lines are reduced since the blue emitters (80*a* and 80*c*; 80*b* and 80*d*) are combined. The driver type, voltage, and timing can be the same as already known in the art for each device technology.

Figure 8:
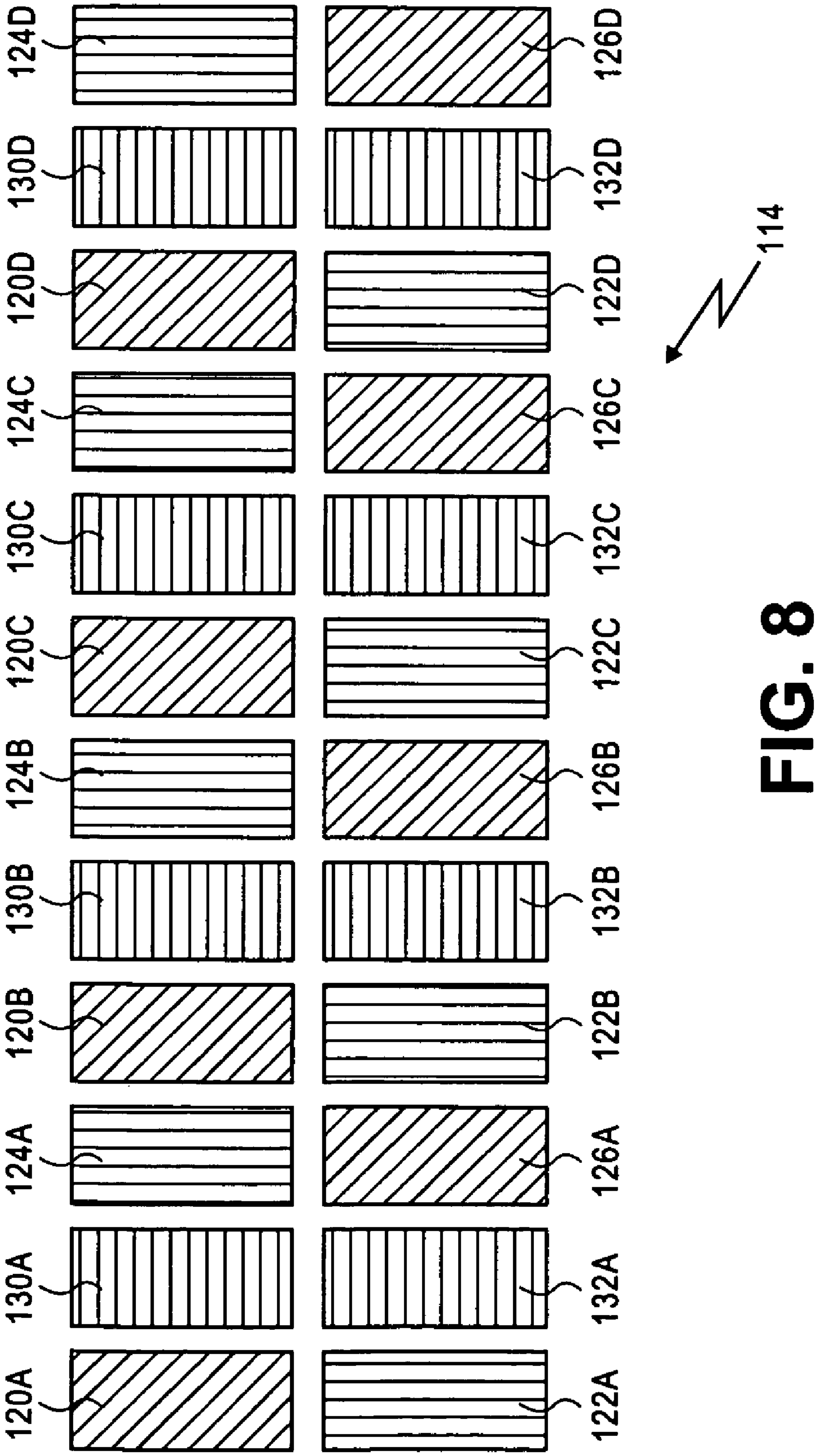
FIG. 8 is another arrangement of four three-color pixel elements, aligned horizontally.
Figure 9:
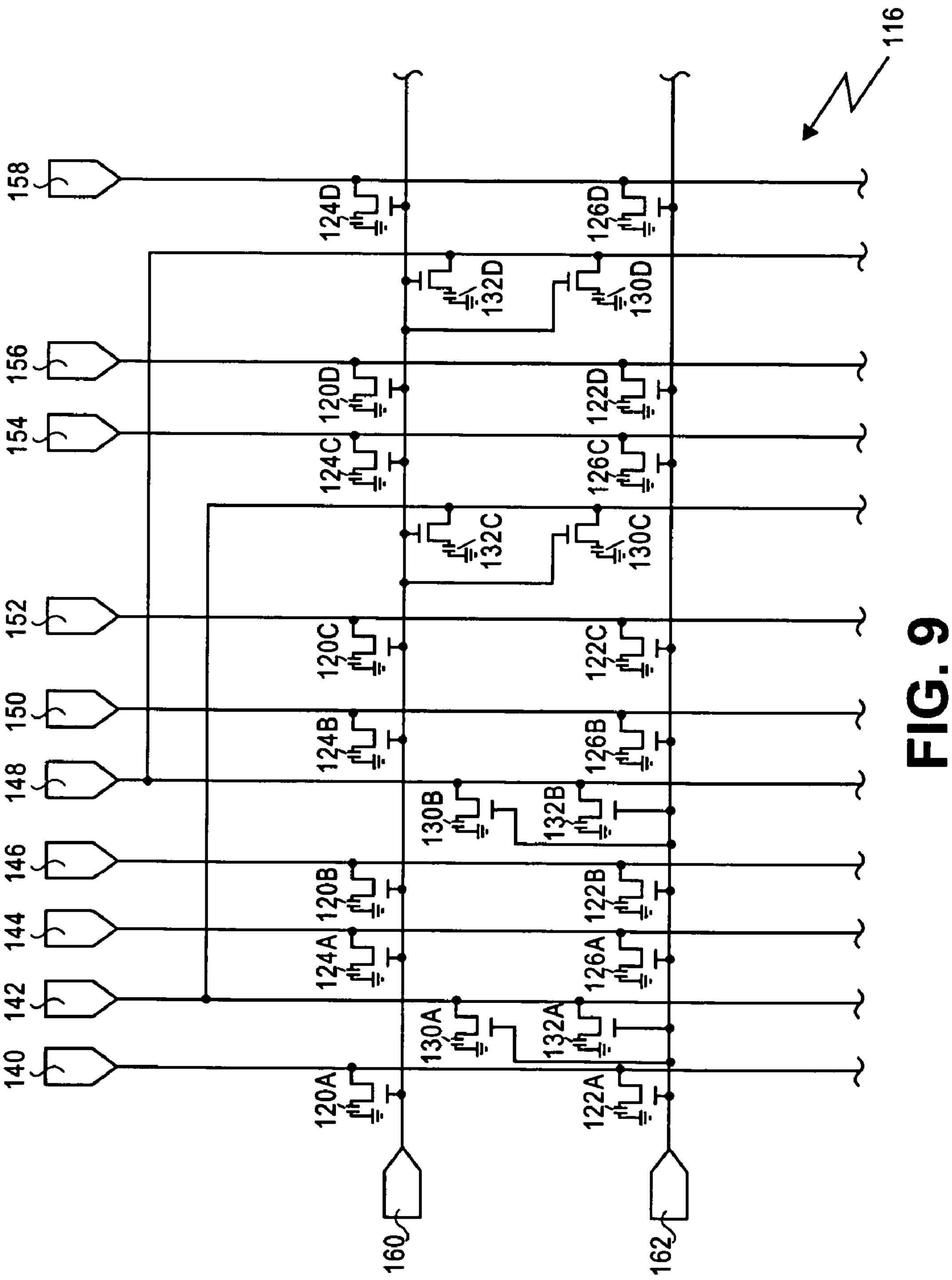
FIG. 9 is a diagram showing an illustrative drive matrix for the pixel arrangement of FIG. 8.

Another embodiment of a three-color pixel element arrangement and drive matrix is illustrated in FIGS. 8 and 9. FIG. 8 is an arrangement 114 of four three-color pixel elements aligned horizontally in an array row. Each three-color pixel element can be square-shaped or rectangular-shaped and has two rows including three unit-area polygons, such that an emitter occupies each unit-area polygon. Disposed in the center of the first pixel row of the first, second, third, and fourth three-color pixel elements are blue emitters 130*a*, 130*b*, 130*c*, and 130*d*, respectively. Disposed in the center of the second pixel row of the first, second, third, and fourth three-color pixel elements are blue emitters 132*a*, 132*b*, 132*c*, and 132*d*, respectively. Red emitters 120*a*, 120*b*, 120*c*, and 120*d* are disposed in the first pixel row, to the left of blue emitters 130*a*, 130*b*, 130*c*, and 130*d*, of the first, second, third, and fourth three-color pixel elements, respectively. Green emitters 122*a*, 122*b*, 122*c*, and 122*d* are disposed in the second pixel row, to the left of blue emitters 132*a*, 132*b*, 132*c*, and 132*d*, of the first, second, third, and fourth three-color pixel elements, respectively. Green emitters 124*a*, 124*b*, 124*c*, and 124*d* are disposed in the first pixel row, to the right of blue emitters 130*a*, 130*b*, 130*c*, and 130*d*, of the first, second, third, and fourth three-color pixel elements, respectively. Red emitters 126*a*, 126*b*, 126*c*, and 126*d* are disposed in the second pixel row, to the right of blue emitters 132*a*, 132*b*, 132*c*, and 132*d*, of the first, second, third, and fourth three-color pixel elements, respectively.

FIG. 9 is a diagram of an illustrative drive matrix 116 for the three-color pixel element arrangement 114. The illustrative drive matrix 116 shown in FIG. 9 consists of a 2×10 drive matrix, where eight column drivers drive the eight red and eight green emitters coupled to column lines and two column drivers drive the four blue emitters coupled to column lines. A first column driver 140 drives the red emitter 120*a* and the green emitter 122*a*. The blue emitters 130*a*, 132*a*, 130*c*, and 132*c* are tied together and driven by a second column driver 142. A third column driver 144 drives the green emitter 124*a* and the red emitter 126*a*, while a fourth column driver 146 drives the red emitter 120*b* and the green emitter 122*b*. A fifth column driver 148 drives blue emitters 130*b* and 132*b*, which are tied together with 130*d* and 132*d*. The green emitter 124*b* and the red emitter 126*b* are driven by a sixth column driver 150, while a seventh column driver 152 drives red emitter 120*c* and green emitter 122*c*. An eighth column driver 154 drives green emitter 124*c* and red emitter 126*c*, while a ninth column driver 156 drives red emitter 120*d* and green emitter 122*d*. Finally, a tenth column driver 158 drives green emitter 124*d* and red emitter 126*d*.

The row drivers drive the red, green and blue emitters in each pixel row. Row driver 160 drives red emitters 120*a*, 120*b*, 120*c*, and 120*d*, green emitters 124*a*, 124*b*, 124*c*, and 124*d*, as well as blue emitters 130*c*, 132*c*, 130*d*, and 132*d*. Row driver 162 drives green emitters 122*a*, 122*b*, 122*c*, and 122*d*, red emitters 126*a*, 126*b*, 126*c*, and 126*d*, and blue emitters 130*a*, 132*a*, 130*b*, and 132*b*. Each emitter can be driven at continuous luminance values at specific locations in a pixel element, unlike emitters in the prior art, which are driven at discrete luminance values at random locations in a three-color pixel element.

The drive matrix uses approximately 16.6% fewer column drivers to present a given image than does a prior art 2×12-drive matrix for the triad arrangement. The column lines are reduced since the blue emitters (130*a*, 132*a* and 130*c*, 132*c*; 130*b*, 132*b* and 130*d*, 132*d*) are combined. The driver type, voltage, and timing can be the same as already known in the art for each device technology.

Figure 10:
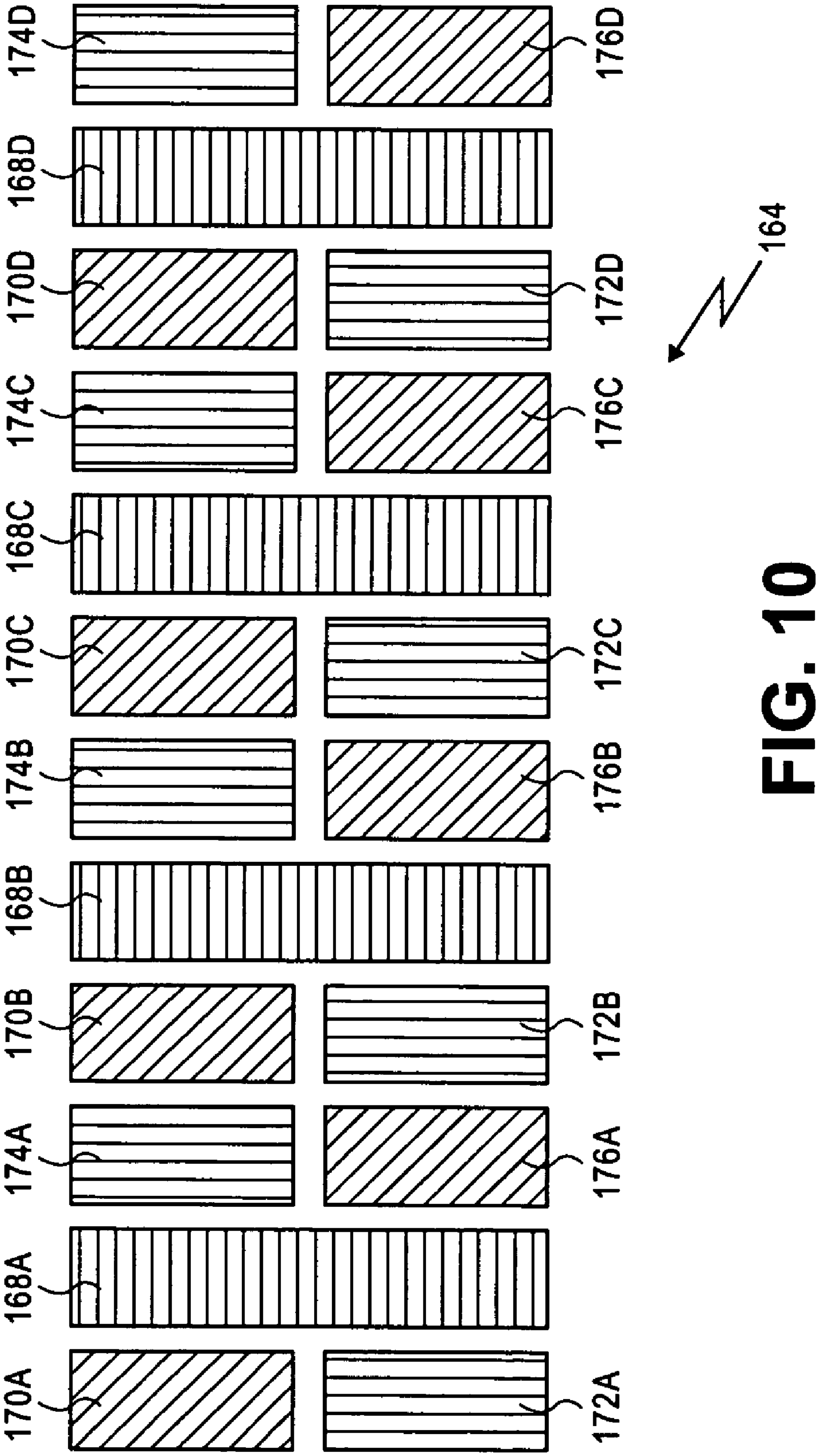
FIG. 10 is another arrangement of four three-color pixel elements, aligned horizontally.
Figure 11:
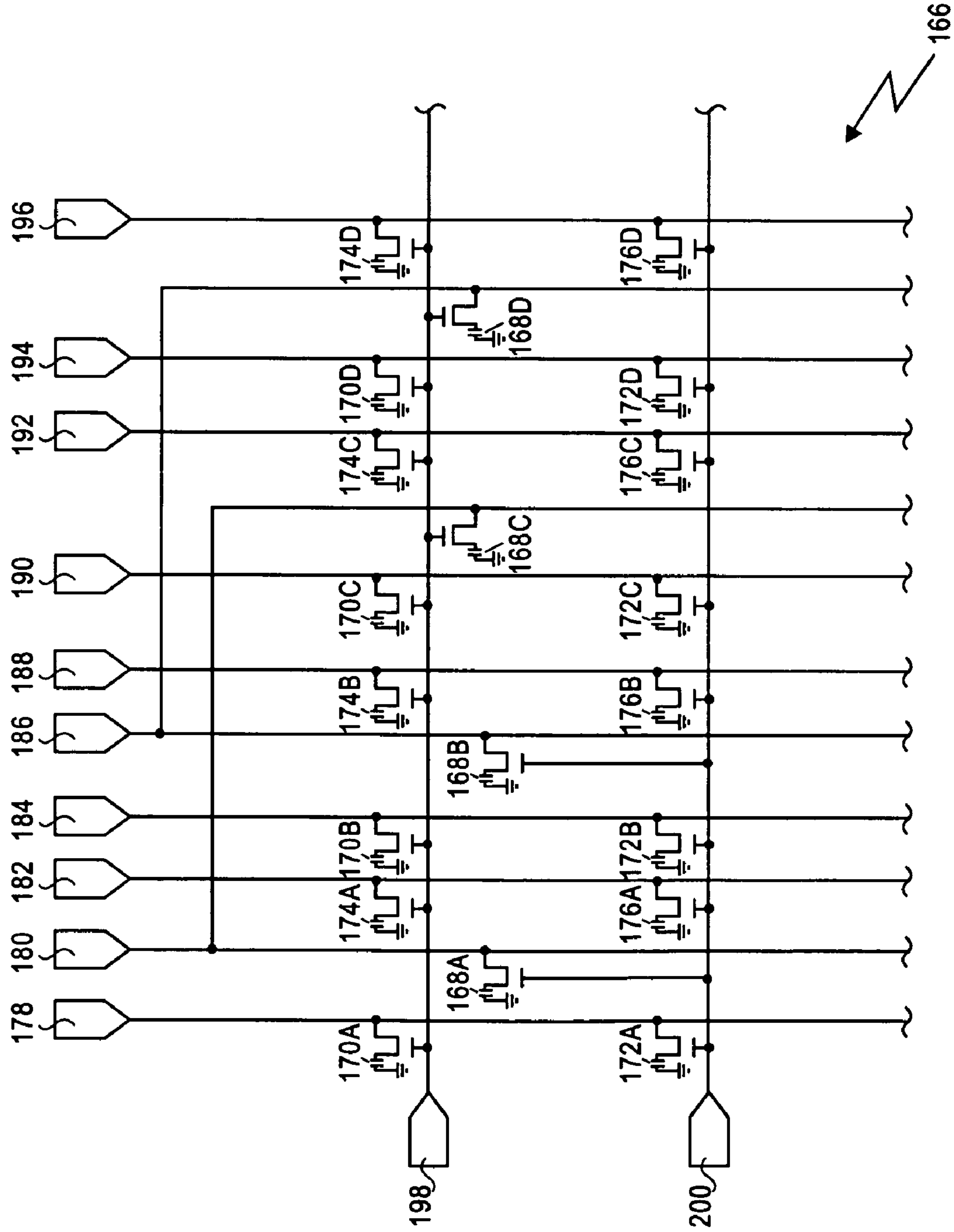
FIG. 11 is a diagram showing an illustrative drive matrix for the pixel arrangement of FIG. 10.

Another embodiment of a three-color pixel element arrangement and drive matrix is illustrated in FIGS. 10 and 11. FIG. 10 is an arrangement 164 of four three-color pixel elements aligned horizontally in an array row. Each three-color pixel element can be square-shaped or rectangular-shaped and has two rows with each row including three unit-area polygons, such that an emitter occupies each unit-area polygon. At least one unit-area polygon is at least two times the area of the other unit-area polygons and is occupied by blue emitters 168*a*, 168*b*, 168*c*, and 168*d*. The blue emitters 168*a*, 168*b*, 168*c*, and 168*d* can be formed as a single emitter or can be two separate blue emitters wired together.

As illustrated in FIG. 10, blue emitters 168*a*, 168*b*, 168*c*, and 168*d* are disposed between the red emitters and green emitters of the first, second, third, and fourth three-color pixel elements, respectively. The red emitters and green emitters are disposed in two pixel rows. Red emitters 170*a*, 170*b*, 170*c*, and 170*d* are disposed in the first pixel row, to the left of blue emitters 168*a*, 168*b*, 168*c*, and 168*d*, of the first, second, third, and fourth three-color pixel elements, respectively. Green emitters 172*a*, 172*b*, 172*c*, and 172*d* are disposed in the second pixel row, to the left of blue emitters 168*a*, 168*b*, 168*c*, and 168*d*, of the first, second, third, and fourth three-color pixel elements, respectively. Green emitters 174*a*, 174*b*, 174*c*, and 174*d* are disposed in the first pixel row, to the right of blue emitters 168*a*, 168*b*, 168*c*, and 168*d*, of the first, second, third, and fourth three-color pixel elements, respectively. Red emitters 176*a*, 176*b*, 176*c*, and 176*d* are disposed in the second pixel row, to the right of blue emitters 168*a*, 168*b*, 168*c*, and 168*d*, of the first, second, third, and fourth three-color pixel elements, respectively.

FIG. 11 is a diagram of an illustrative drive matrix 166 for the three-color pixel element arrangement 164. The illustrative drive matrix 78 shown in FIG. 11 consists of a 2×10 drive matrix, where eight column drivers drive the eight red and eight green emitters coupled to column lines and two column drivers drive the four blue emitters coupled to column lines. A first column driver 178 drives the red emitter 170*a* and the green emitter 172*a*. The blue emitters 168*a* and 168*c* are tied together and driven by a second column driver 180. A third column driver 182 drives the green emitter 174*a* and the red emitter 176*a*, while a fourth column driver 184 drives the red emitter 170*b* and the green emitter 172*b*. A fifth column driver 186 drives the blue emitter 168*b*, which is tied together with 168*d*. The green emitter 174*b* and the red emitter 176*b* are driven by a sixth column driver 188, while a seventh column driver 190 drives red emitter 170*c* and green emitter 172*c*. An eighth column driver 192 drives green emitter 174*c* and red emitter 176*c*, while a ninth column driver 194 drives red emitter 170*d* and green emitter 172*d*. Finally, a tenth column driver 196 drives green emitter 174*d* and red emitter 176*d*.

The row drivers drive the red, green and blue emitters in each pixel row. Row driver 198 drives red emitters 170*a*, 170*b*, 170*c*, and 170*d*, green emitters 174*a*, 174*b*, 174*c*, and 174*d*, as well as blue emitters 168*c* and 168*d*. Row driver 200 drives green emitters 172*a*, 172*b*, 172*c*, and 172*d*, red emitters 176*a*, 176*b*, 176*c*, and 176*d*, and blue emitters 168*a* and 168*b*. Each emitter can be driven at continuous luminance values at specific locations in a pixel element, unlike emitters in the prior art, which are driven at discrete luminance values at random locations in a three color pixel element.

The drive matrix uses approximately 16.6% fewer column drivers to present a given image than does a prior art 2×12-drive matrix for the triad arrangement. The column lines are reduced since the blue emitters (168*a* and 168*c*; 168*b* and 168*d*) are combined. The driver type, voltage, and timing can be the same as already known in the art for each device technology.

Figure 12:
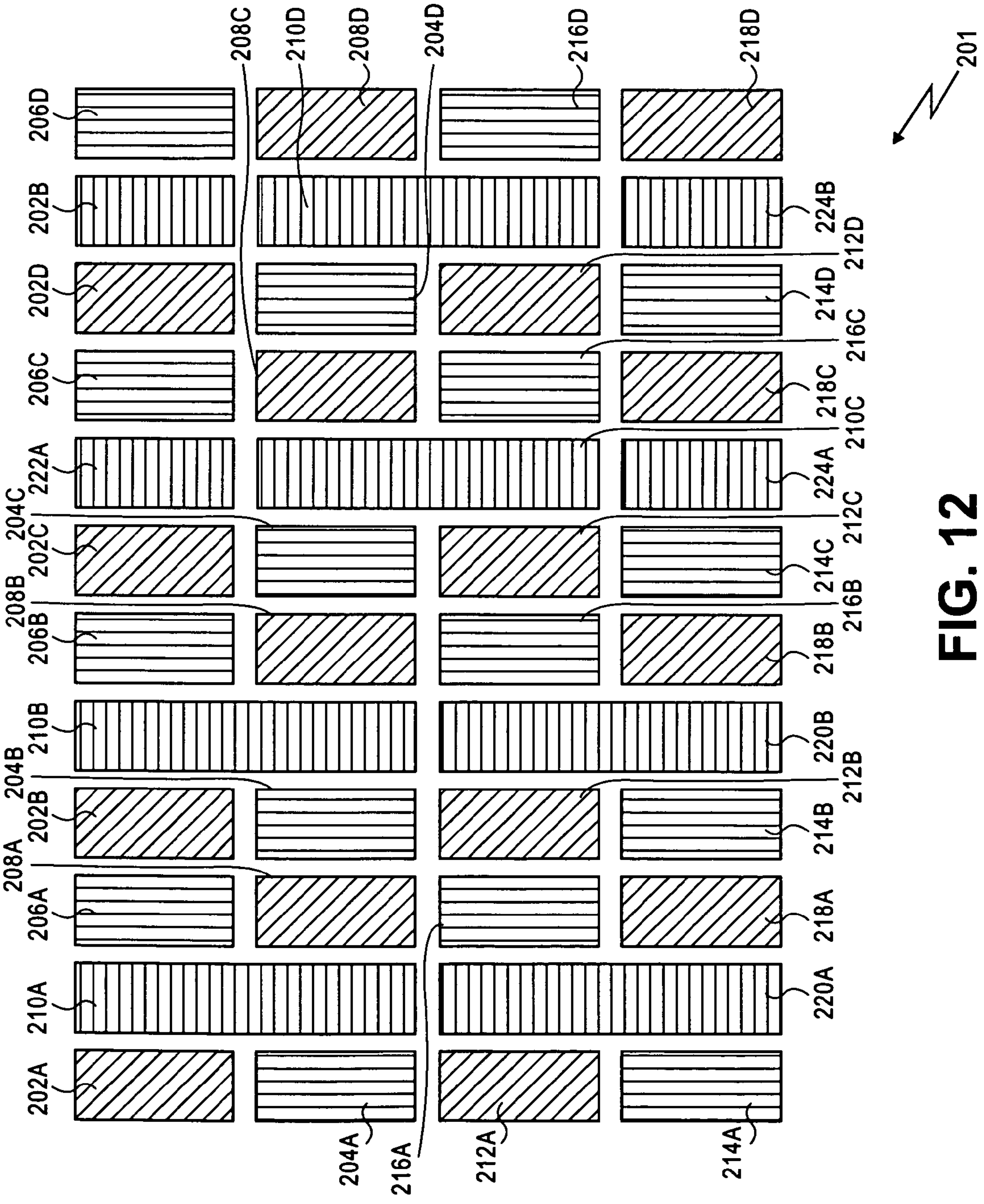
FIG. 12 is another arrangement of four three-color pixel elements, aligned horizontally.
Figure 13:
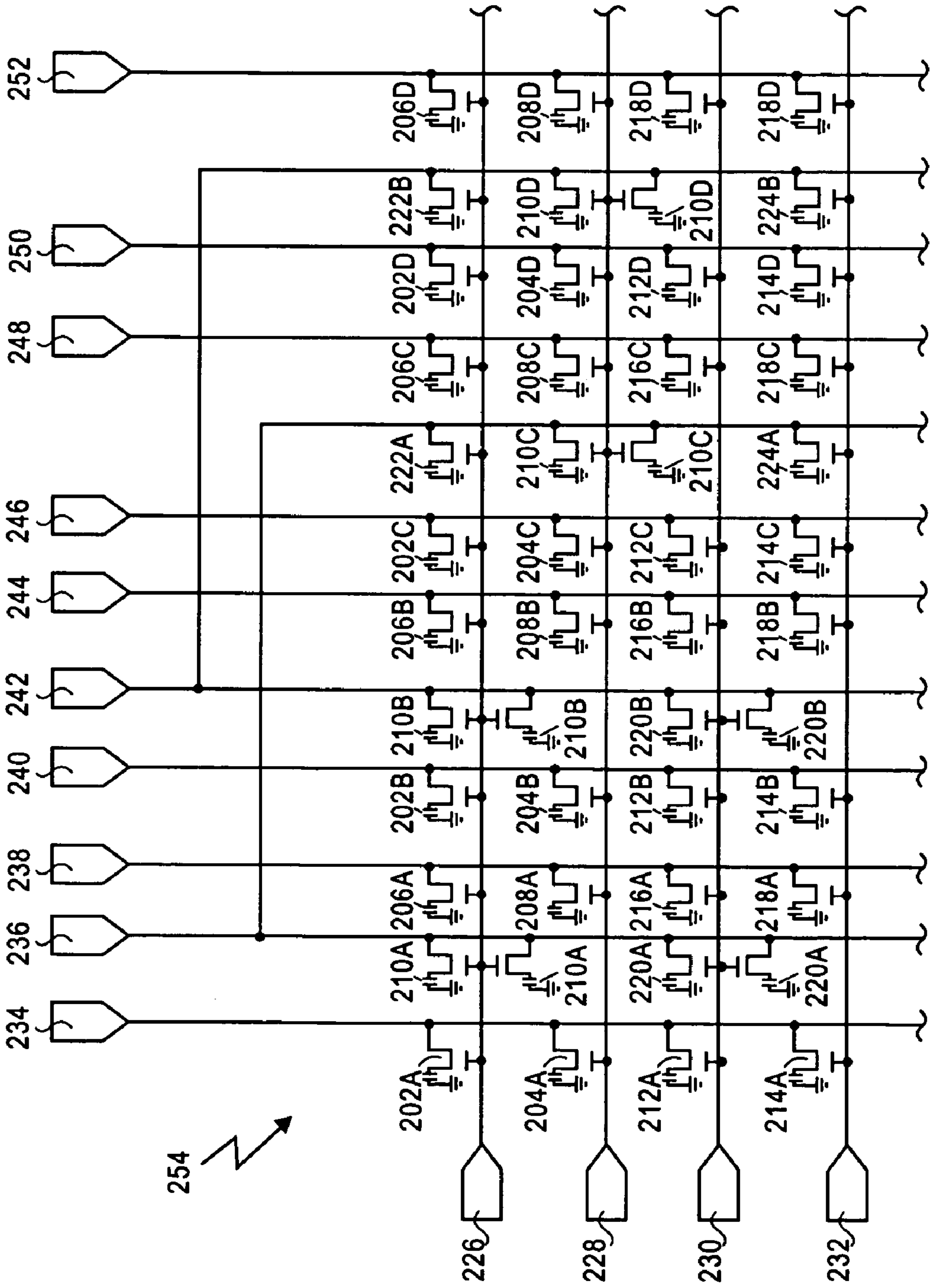
FIG. 13 is a diagram showing an illustrative drive matrix for the pixel arrangement of FIG. 12.

Another embodiment of a three-color pixel element arrangement and drive matrix is illustrated in FIGS. 12 and 13. FIG. 12 is an arrangement 201 of eight three-color pixel elements aligned horizontally, four in each array row. Each three-color pixel element can be square-shaped or rectangular-shaped and has two rows with each row including three unit-area polygons, such that an emitter occupies each unit-area polygon. At least one unit-area polygon is at least two times the area of the other unit-area polygons and is occupied by blue emitters 210*a*, 210*b*, 210*c*, 210*d*, 220*a*, and 220*b*. The blue emitters 210*a*, 210*b*, 210*c*, 210*d*, 220*a*, and 220*b* can be formed as a single emitter or can be two separate blue emitters wired together. In this arrangement 201, the blue emitters 210*b* and 210*d* are staggered such that a smaller blue emitter (the size of the red and green emitters) will be positioned at the edges of the array vertically aligned with the large blue emitter, as illustrated in FIG. 12. For example, blue emitters 222*a*, 224*a* are vertically disposed on either side of the staggered blue emitter 210*c* and blue emitters 222*b*, 224*b* are vertically disposed on either side of the staggered blue emitter 210*d*.

As illustrated in FIG. 12, blue emitters 210*a*, 210*b*, 210*c*, 210*d*, 220*a*, 220*b*, 222*a*, 222*b*, 224*a*, and 224*b* are disposed between the red emitters and green emitters. Red emitters 202*a*, 202*b*, 202*c*, 202*d* are disposed in the first pixel row of the first array row and green emitters 204*a*, 204*b*, 204*c*, and 204*d* are disposed in the second pixel row of the first array row to the left of blue emitters 210*a*, 210*b*, 210*c* & 222*a*, and 210*d* & 222*b* of the first, second, third, and fourth three-color pixel elements, respectively. Green emitters 206*a*, 206*b*, 206*c*, and 206*d* are disposed in the first pixel row of the first array row and red emitters 208*a*, 208*b*, 208*c*, and 208*d* are disposed in the second pixel row of the first array row to the right of blue emitters 210*a*, 210*b*, 210*c* & 222*a*, and 210*d* & 222*b* of the first, second, third, and fourth three-color pixel elements, respectively. Red emitters 212*a*, 212*b*, 212*c*, and 212*d* are disposed in the first pixel row of the second array row and green emitters 214*a*, 214*b*, 214*c*, and 214*d* are disposed in the second pixel row of the second array row to the left of blue emitters 220*a*, 220*b*, 220*c* & 224*a*, and 210*d* & 224*b* of the first, second, third, and fourth three-color pixel elements, respectively. Green emitters 216*a*, 216*b*, 216*c*, and 216*d* are disposed in the first pixel row of the second array row and red emitters 218*a*, 218*b*, 218*c*, and 218*d* are disposed in the second pixel row of the second array row to the right of blue emitters 220*a*, 220*b*, 220*c* & 224*a*, and 210*d* & 224*b* of the first, second, third, and fourth three-color pixel elements, respectively. An individual skilled in the art will appreciate that the large blue emitters are staggered throughout the array, which requires having smaller blue emitters at the edges vertically aligned with the larger blue emitters.

FIG. 13 is a diagram of an illustrative drive matrix 254 for the three-color pixel element arrangement 201 illustrated in FIG. 12. The illustrative drive matrix 254 shown in FIG. 13 consists of a 2×10 drive matrix, where eight column drivers drive the sixteen red and sixteen green emitters coupled to column lines and two column drivers drive the ten blue emitters coupled to column lines. A first column driver 234 drives the red emitters 202*a*, 212*a* and the green emitters 204*a*, 214*a*. The blue emitters 210*a*, 220*a* are tied together with blue emitters 222*a*, 210*c*, 224*a* and are driven by a second column driver 236. A third column driver 238 drives the green emitters 206*a*, 216*a* and the red emitters 208*a*, 218*a*, while a fourth column driver 240 drives the red emitters 202*b*, 212*b* and the green emitters 204*b*, 214*b*. A fifth column driver 242 drives the blue emitters 210*b*, 220*b*, which is tied together with 222*b*, 210*d*, 224*b*. The green emitters 206*b*, 216*b* and the red emitters 208*b*, 218*b* are driven by a sixth column driver 244, while a seventh column driver 246 drives red emitters 202*c*, 212*c* and green emitters 204*c*, 214*c*. An eighth column driver 248 drives green emitters 206*c*, 216*c* and red emitters 208*c*, 218*c*, while a ninth column driver 250 drives red emitters 202*d*, 212*d* and green emitters 204*d*, 214*d*. Finally, a tenth column driver 252 drives green emitters 206*d*, 216*d* and red emitters 208*d*, 218*d*.

The row drivers drive the red, green and blue emitters in each pixel row. Row driver 226 drives red emitters 202*a*, 202*b*, 202*c*, and 202*d*, green emitters 206*a*, 206*b*, 206*c*, and 206*d*, as well as blue emitters 210*a*, 210*b*, 222*a*, 222*b*. Row driver 228 drives green emitters 204*a*, 204*b*, 204*c*, and 204*d*, red emitters 208*a*, 208*b*, 208*c*, and 208*d*, and blue emitters 210*c*, 210*d*. Row driver 230 drives red emitters 212*a*, 212*b*, 212*c*, and 212*d*, green emitters 216*a*, 216*b*, 216*c*, and 216*d*, as well as blue emitters 220*a*, 220*b*. Row driver 232 drives green emitters 214*a*, 214*b*, 214*c*, and 214*d*, red emitters 218*a*, 218*b*, 218*c*, and 218*d*, and blue emitters 224*a*, 224*b*. Each emitter can be driven at continuous luminance values at specific locations in a three-color pixel element, unlike emitters in the prior art, which are driven at discrete luminance values at random locations in a three color pixel element.

The drive matrix uses approximately 16.6% fewer column drivers to present a given image than does a prior art 2×12-drive matrix for the triad arrangement. The column lines are reduced since the blue emitters (210*a*, 220*a* and 210*c*, 222*a*, 224*a*; 210*b*, 220*b* and 210*d*, 222*b*, 224*b*) are combined. The driver type, voltage, and timing can be the same as already known in the art for each device technology.

Dot inversion is the preferred method of choice for driving panels having the arrangement of columns and rows as discussed above. Each blue, red and green emitter is driven with alternating polarities. For example, in a first drive event, a red emitter is driven with a positive voltage and at the next drive event, the same red emitter is driven with a negative voltage. In using the arrangements illustrated in FIGS. 6, 8, 10, and 12 that connect the column line of the blue emitter of the first three-color pixel element with its next nearest neighboring three-color pixel element (e.g., the blue emitter of the third three-color pixel element). Likewise, the blue emitter of the second three-color pixel element is coupled with its next nearest neighboring three-color pixel element (e.g., the blue emitter of the fourth three-color pixel element). The "next nearest neighboring" three-color pixel element can be construed as being every other blue emitter of a pair of three-color pixel elements coupled together. For example, the first three-color pixel element is connected with the third three-color pixel element, the second three-color pixel element is connected with the fourth three-color pixel element, the fifth three-color pixel element is connected with the seventh three-color pixel element, the sixth three-color pixel element is connected with the eight three-color pixel element, etc. In this case, any incidence of "flicker" is reduced or eliminated.

Figure 14:
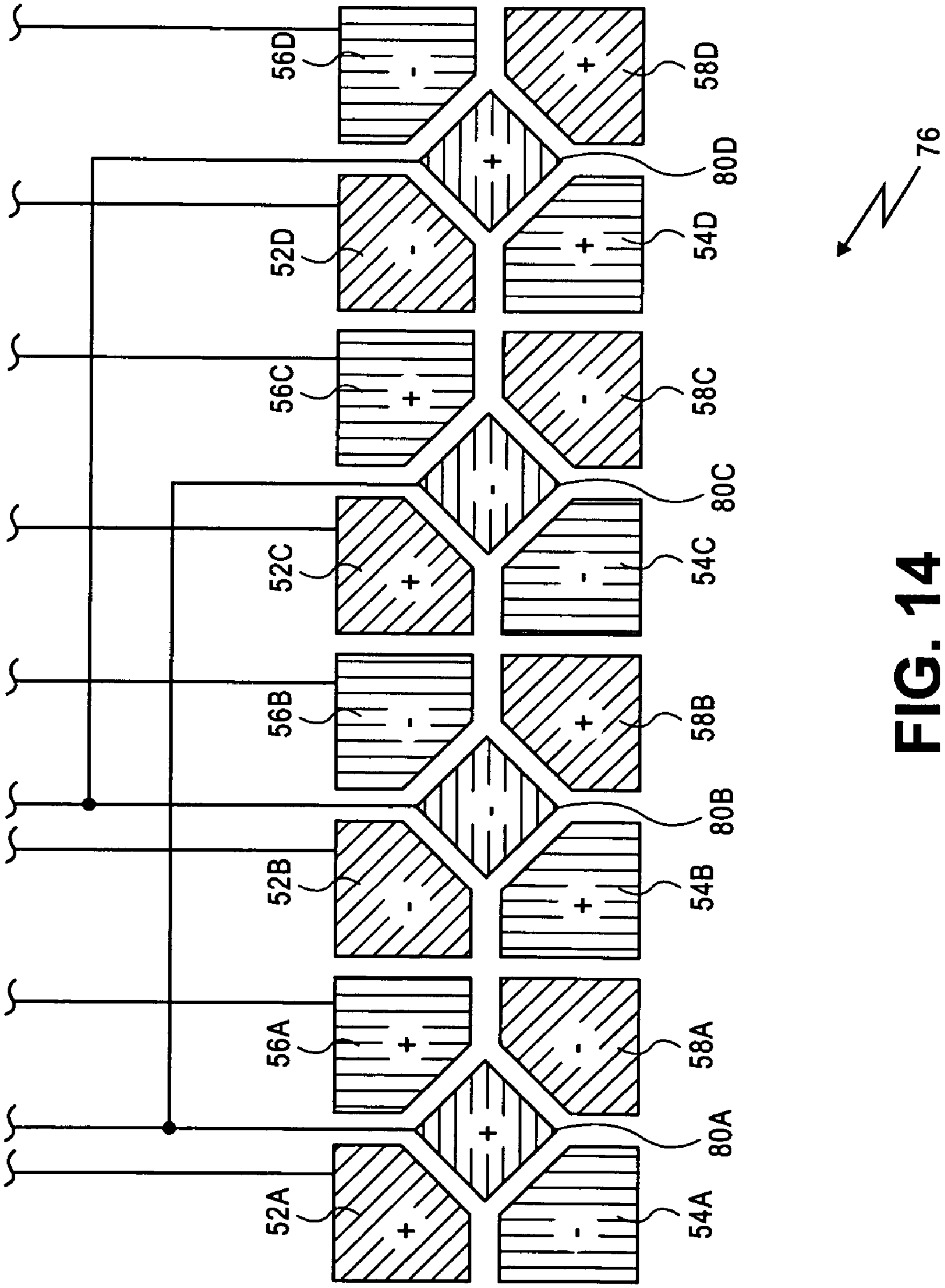
FIG. 14 is a diagram illustrating a dot inversion scheme for the pixel arrangement of FIG. 6.

In using these arrangements, every column line must be driven with a signal of polarity opposite of its neighbors to guarantee, that should any crosstalk occur, it would be the same for each column. If the array is not driven in this way, asymmetrical crosstalk will result in visible artifacts across the screen. Also, nearby red and green emitters of separate pixel elements must be driven by signals of the opposite polarity to ensure that "flicker" will not occur. For example, FIG. 14 illustrates the polarities of the red, green, and blue emitters on the same arrangement in FIG. 6. Here, green emitter 56*a* (having a positive value) must have an opposite polarity than red emitter 52*b* (having a negative value). This arrangement eliminates "flicker" since the column line connects one blue emitter with the blue emitter of its next nearest neighboring three-color pixel element. The polarities shown on the blue emitters are those of the column lines, not the polarities stored on the blue emitter. The polarity of the blue emitter is determined by the row that is actively addressing the blue emitter, which is connected to the blue emitter of its next nearest neighboring three-color pixel element.

Figure 15:
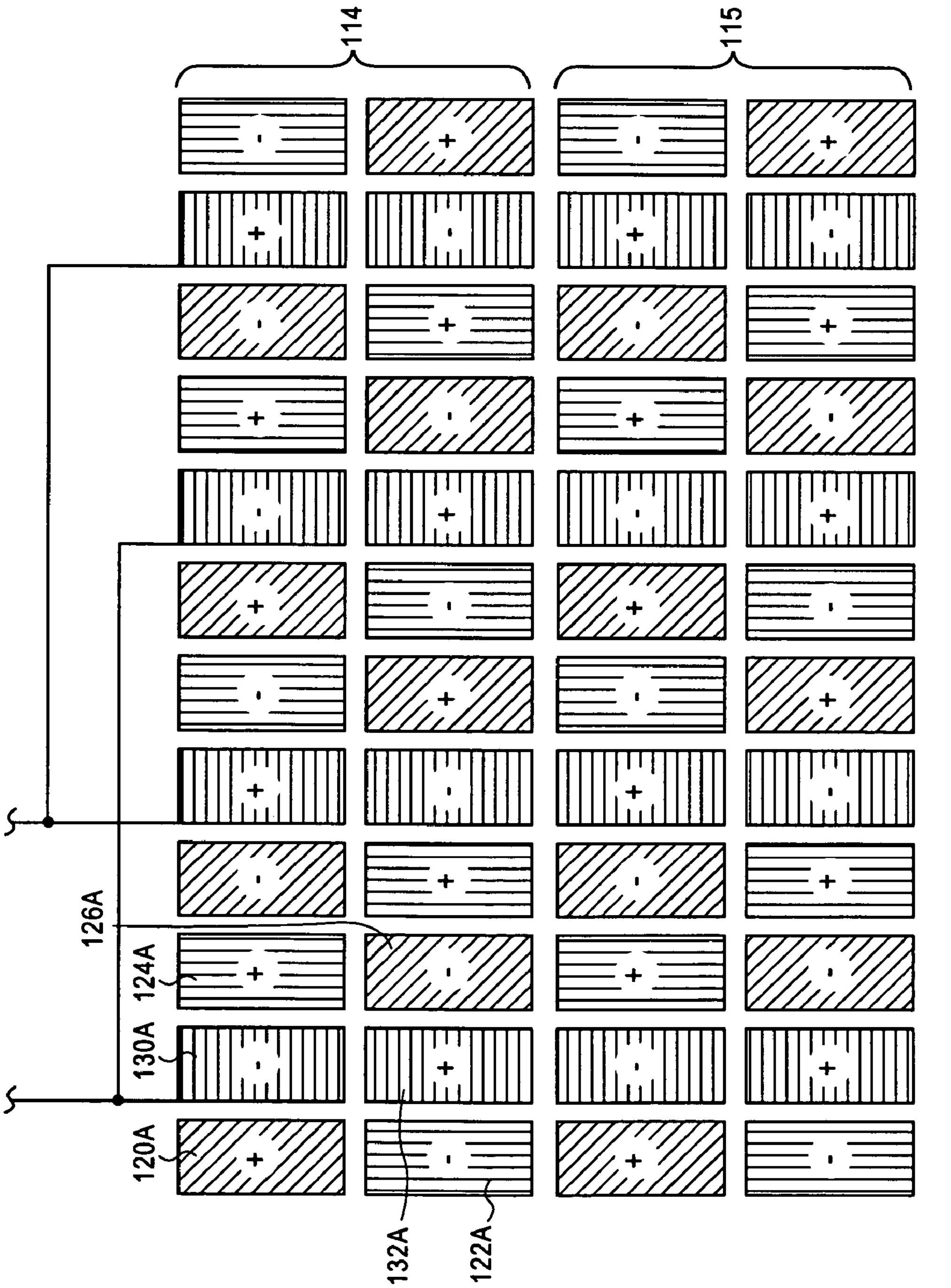
FIG. 15 is another diagram illustrating a dot inversion scheme for the pixel arrangement of FIG. 8.
Figure 16:
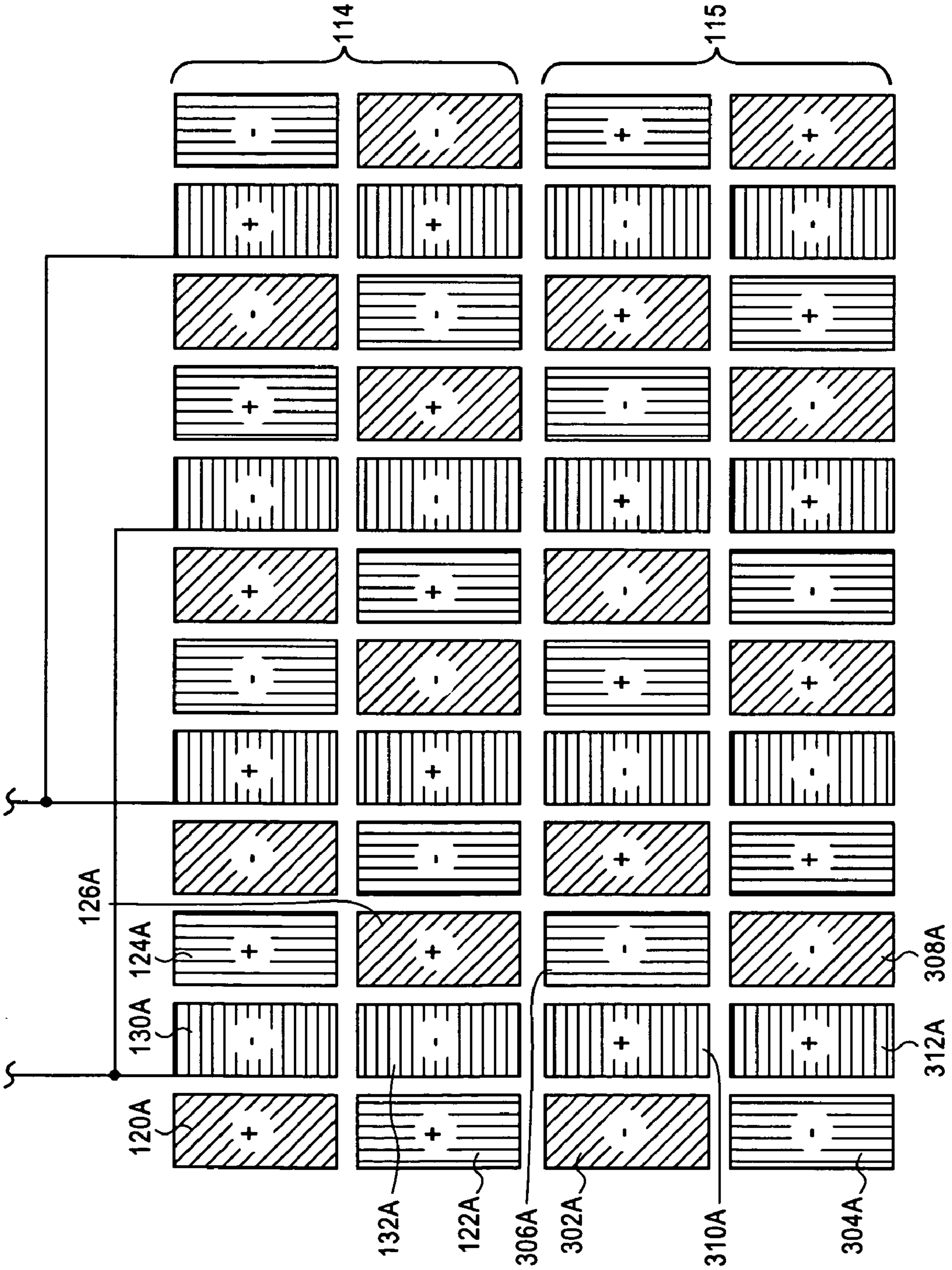
FIG. 16 is an alternate diagram for FIG. 15 also illustrating a dot inversion scheme for the pixel arrangement of FIG. 8.

Additional examples illustrating separate dot inversion schemes by the polarities of the red, green, and blue emitters are found in FIGS. 15 and 16. Both FIGS. 15 and 16 are based on the arrangement 114 illustrated in FIG. 8, including another horizontal arrangement (FIG. 15, 115; FIG. 16, 314). In FIG. 15, red emitter 120*a* (having a positive value) must be driven by signals of an opposite polarity than the polarity of the green emitter 122*a* (having a negative value). Blue emitter 130*a* (having a negative value) must be driven by signals of an opposite polarity than the polarity of the blue emitter 132*a* (having a positive value). Red emitter 124*a* (having a positive value) must be driven by signals of an opposite polarity than the polarity of the green emitter 126*a* (having a negative value). The same polarities are duplicated in the additional horizontal arrangement 115. This arrangement also eliminates "flicker" since the column lines connect one blue emitter with the blue emitter of its next nearest neighboring three-color pixel element.

In FIG. 16, an alternate dot inversion scheme is illustrated with horizontal arrangement 314. Here, red emitters 120*a* and 126*a* and green emitters 122*a* and 124*a* (having positive values) must be driven by signals of an opposite polarity than the polarity of the signals driving the red emitters 302*a* and 308*a* and green emitters 304*a* and 306*a* (having negative values). The same applies for blue emitters 130*a* and 132*a* (having positive values) and blue emitters 310*a* and 312*a* (having negative values). This arrangement also eliminates "flicker" since the column lines connect one blue emitter with the blue emitter of its next nearest neighboring three-color pixel element.

Figure 17:
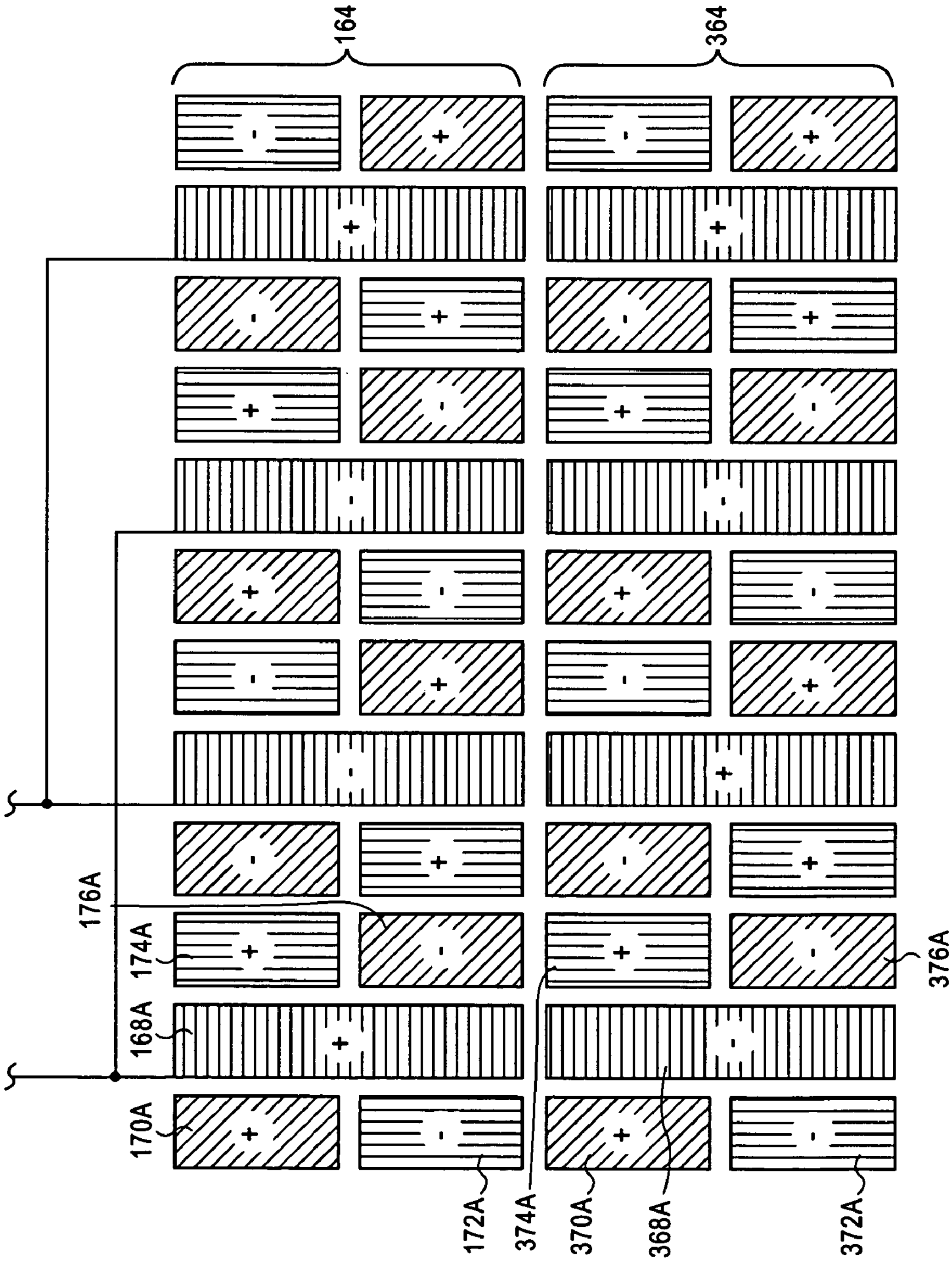
FIG. 17 is another diagram illustrating a dot inversion scheme for the pixel arrangement of FIG. 10.

Another example that illustrates dot inversion by the polarities of the red, green, and blue emitters is found in FIG. 17, which is based on the arrangement 164 illustrated in FIG. 10, including another horizontal arrangement 364. Here, red emitter 170*a* and green emitter 174*a* (having positive values) and green emitter 172*a* and red emitter 176*a* (having negative values) must be driven by signals of the same polarity as red emitter 370*a* and green emitter 374*a* (having positive values)

and green emitter 372a and red emitter 376a (having negative values), respectively. Blue emitter 168a (having a positive value) must be driven by signals of an opposite polarity than blue emitter 368a (having a negative value). This arrangement also eliminates "flicker" since the column lines connect a blue emitter with the blue emitter of its next nearest neighboring three-color pixel element.

Figure 18:
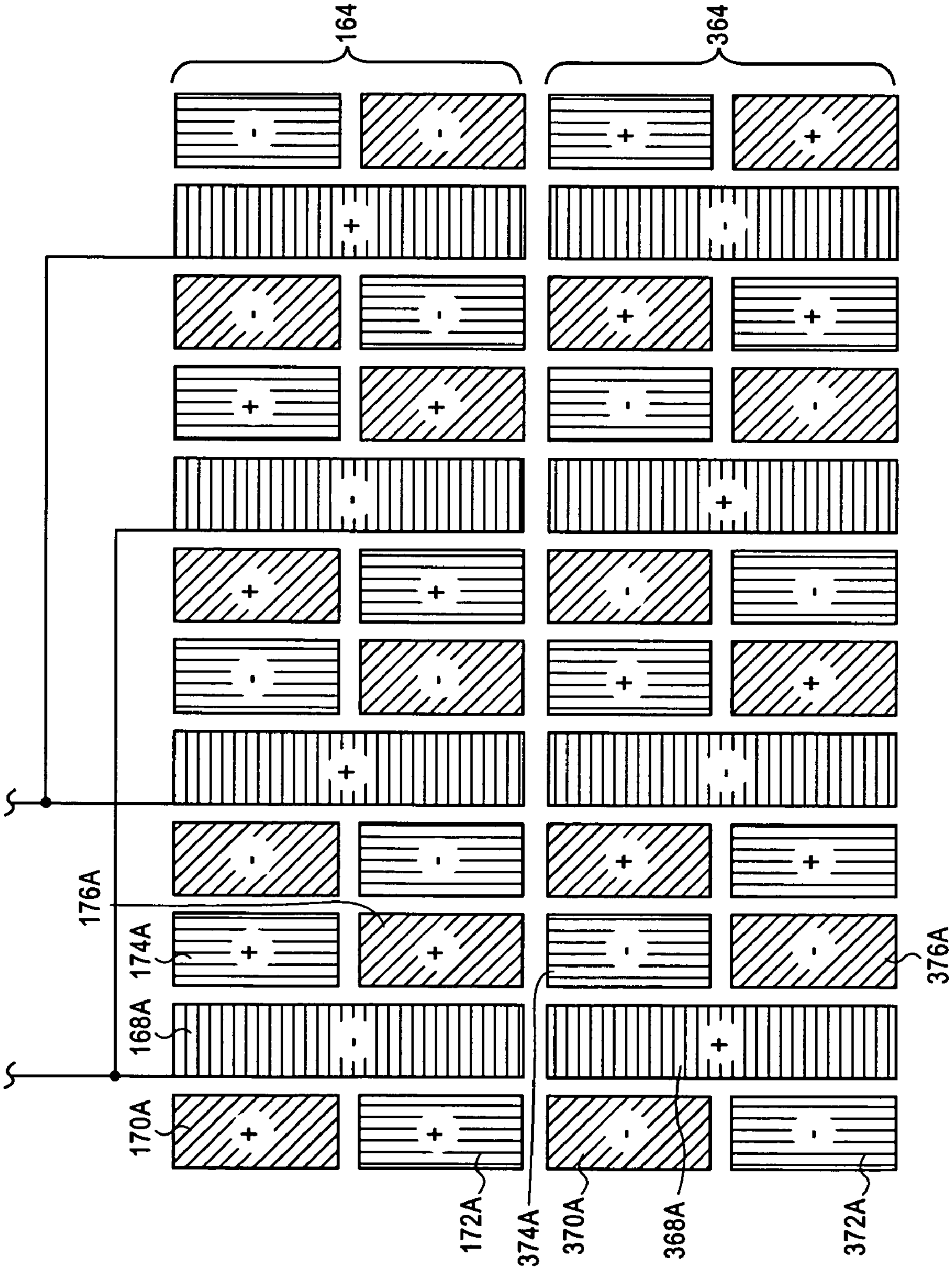
FIG. 18 is an alternate diagram for FIG. 17 also illustrating a dot inversion scheme for the pixel arrangement of FIG. 10.

In FIG. 18, an alternate dot inversion scheme is illustrated with horizontal arrangements 164, 264. Here, red emitters 170a, 176a and green emitters 172a, 174a (having positive values) must be driven by signals of an opposite polarity than the polarity of red emitters 370a, 376a and green emitters 372a, 374a (having negative values). The same applies for blue emitter 168a (having a negative value) and blue emitter 368a (having a positive value). This arrangement also eliminates "flicker" since the column lines connect a blue emitter with the blue emitter of its next nearest neighboring three-color pixel element.

Figure 19:
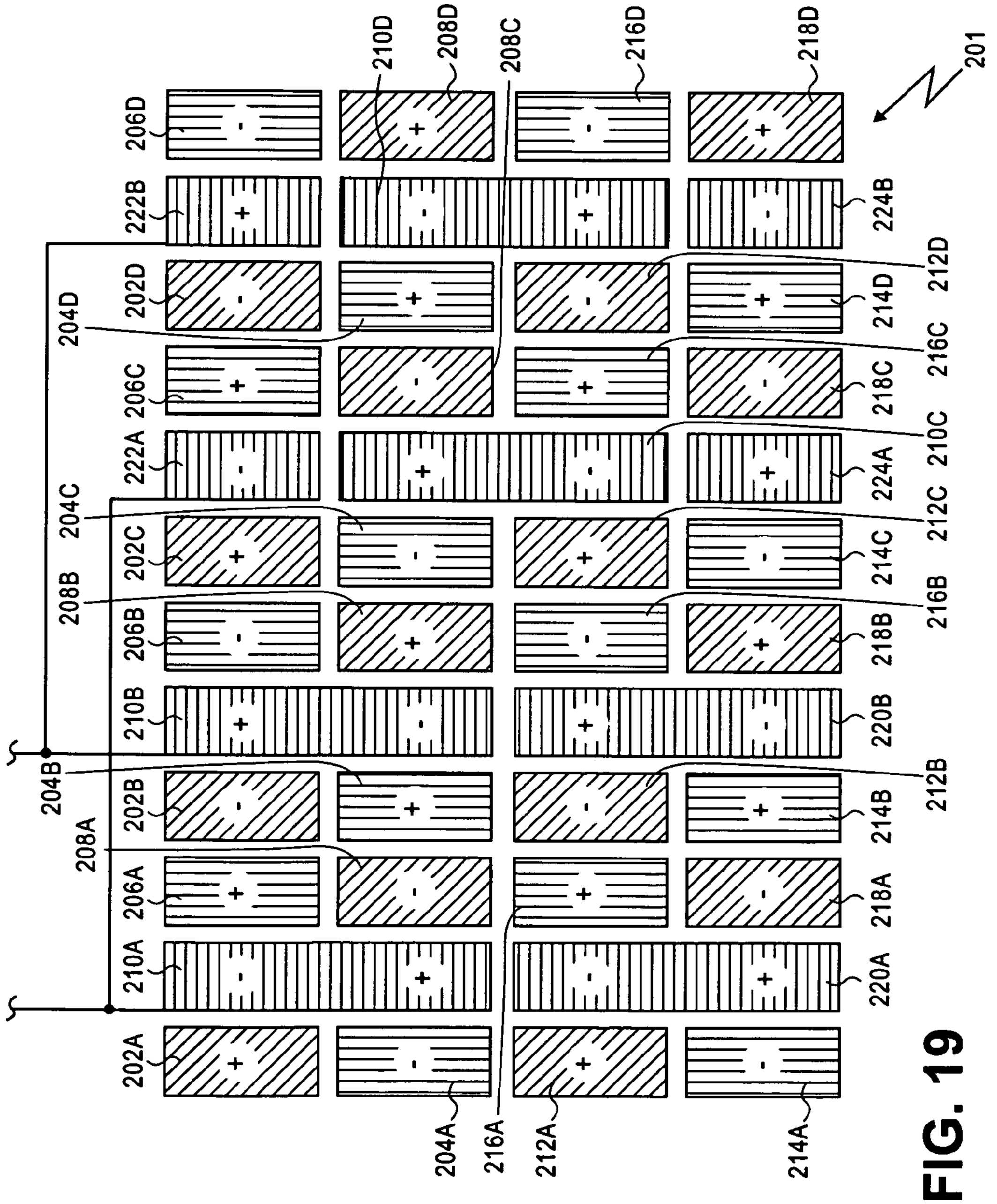
FIG. 19 is another diagram illustrating a dot inversion scheme for the pixel arrangement of FIG. 12.

Another example that illustrates dot inversion by the polarities of the red, green, and blue emitters is found in FIG. 19, which is based on the arrangement 201 illustrated in FIG. 12. Here, red emitter 202a and green emitter 206a (having positive values) and green emitter 204a and red emitter 208a (having negative values) must be driven be driven by signals of the same polarities as red emitter 212a and green emitter 216a (having positive values) and green emitter 214a and red emitter 2186a (having negative values), respectively. Blue emitter 210a (having a positive value with a stored negative value) must be driven by signals of an opposite polarity than blue emitter 220a (having a negative value with a stored positive value). Blue emitter 210c (having a positive value with a stored negative value) must be driven by signals of an opposite polarity than blue emitter 220c (having a negative value with a stored positive value). While blue emitters 222a and 224b must be driven by signals of an opposite polarity than blue emitters 222b and 224a. An individual skilled in the art will appreciate the polarities as described herein. This arrangement also eliminates "flicker" since the column lines connect a blue emitter with the blue emitter of its next nearest neighboring three-color pixel element.

Figure 20:
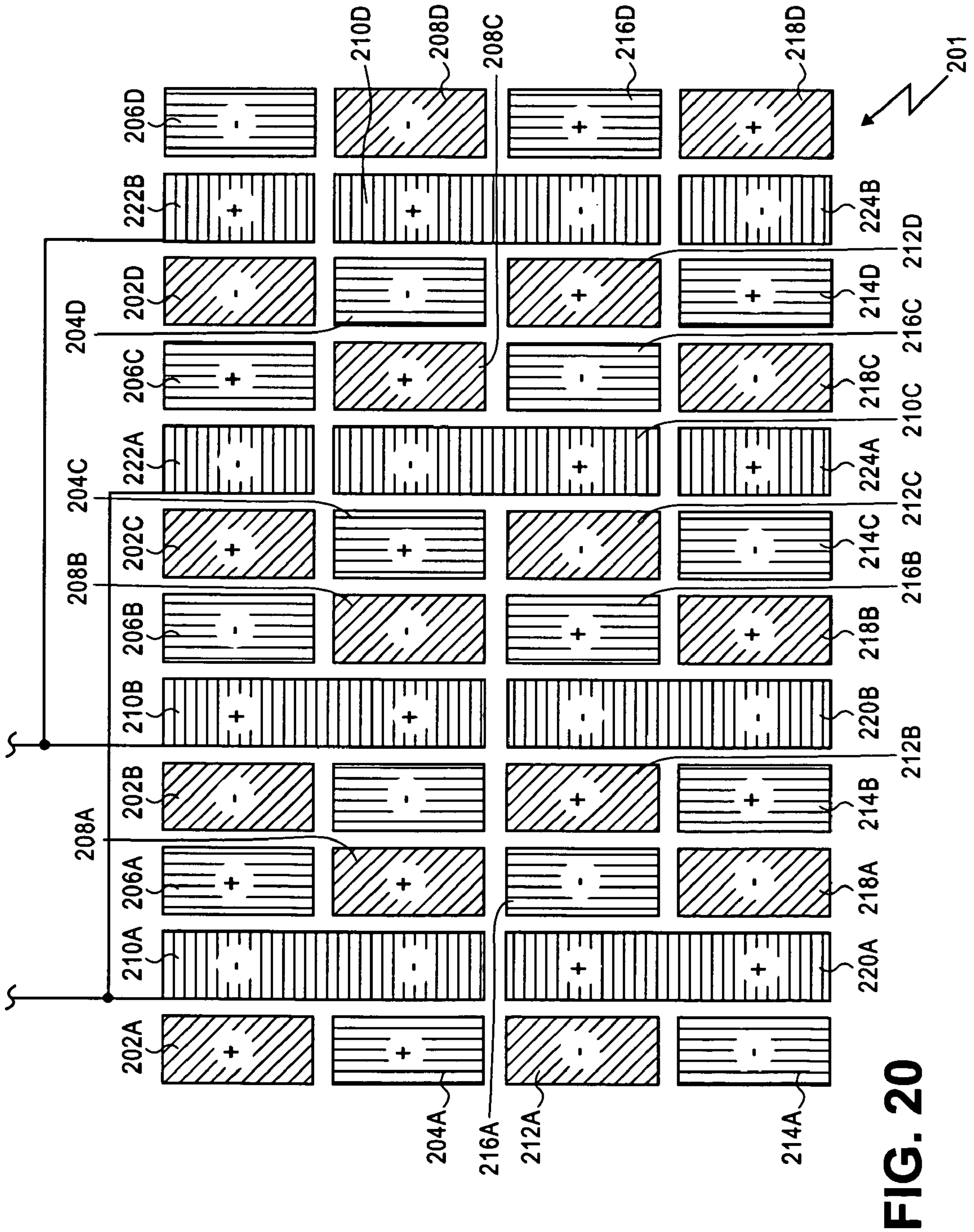
FIG. 20 is an alternate diagram for FIG. 19 also illustrating a dot inversion scheme for the pixel arrangement of FIG. 10.

In FIG. 20, an alternate dot inversion scheme is illustrated with horizontal arrangement 201. Here, red emitters 202a, 208a and green emitters 204a, 206a (having positive values) must be driven by signals of an opposite polarity than red emitters 212a, 218a and green emitters 214a, 216a (having negative values). The same applies for blue emitter 210a (having a negative value with a stored positive value) and blue emitter 220a (having a positive value with a stored negative value). Blue emitter 210c (having a negative value with a stored positive value) must be driven by signals of an opposite polarity than blue emitter 220c (having a positive value with a stored negative value). While blue emitters 222a and 224b must be driven by signals of an opposite polarity than blue emitters 222b and 224a. An individual skilled in the art will appreciate the polarities as described herein. This arrangement also eliminates "flicker" since the column lines connect a blue emitter with the blue emitter of its next nearest neighboring three-color pixel element.

The three-color pixel element, according to any of the above arrangements, can be operated by appropriately driving the individual emitters. A voltage is applied through each row and column driver to each individual row line and column line. At this point, each emitter is illuminated, according to the proper voltage, to create an image on the display.

By connecting the column lines of one blue emitter with the column line of the blue emitter from the next nearest neighboring three-color pixel element, "flicker" is virtually eliminated while at the same time enabling a reduction in column drivers.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of driving a plurality of three-color pixel elements disposed one adjacent to the next in rows and populating a screen in a display, the method comprising:

providing each of the three-color pixel elements as comprising a blue emitter disposed within and at a center of a hypothetical, pixel-area defining square, where the center of the square is disposed at an origin of an X, Y coordinate system having a first, a second, a third, and a fourth quadrant organized in said order around the origin and where the pixel-area defining, hypothetical square is hypothetically subdivided symmetrically to also have corresponding first through fourth quadrants of the square, wherein said blue emitter is square-shaped, having four sides and having its respective four corners lying on one or the other of the X and Y axes of said coordinate system, where the pixel-area defining, hypothetical square further encloses a pair of respective first and second red emitters spaced apart from said blue emitter and symmetrically disposed about said blue emitter so as to be respectively disposed in said second and said fourth quadrants of the hypothetical square, wherein said red emitters occupy respective portions of said second and said fourth quadrants of the hypothetical square not occupied by said blue emitter, wherein said red emitters are generally square-shaped but have truncated inwardly-facing corners forming edges parallel to the sides of said blue emitter, and where the pixel-area defining, hypothetical square further encloses a pair of respective first and second green emitters spaced apart from said blue emitter so as to be respectively and symmetrically disposed about said blue emitter in said first and said third quadrants of the hypothetical square, wherein said green emitters occupy respective portions of said first and said third quadrants of the hypothetical square not occupied by said blue emitter, wherein said green emitters are generally square-shaped but have truncated inwardly-facing corners forming edges parallel to said sides of said blue emitter; and selectively applying luminance-defining drive signals and row select drive signals to said blue emitter, said red emitters, and said green emitters of the plural three-color pixel elements, wherein during said a in of the luminance-defining and row select drive signals, said blue emitter of a first of said three-color pixel elements in a first of the rows receives its respective luminance-defining drive signal from a first data line, and the same first data line is coupled to apply a respective other luminance-defining drive signal to another blue emitter of the same first row at a different time.

2. A method of driving a plurality of three-color pixel elements disposed one adjacent to the next in rows and populating a screen in a display, the method comprising:

providing each of the three-color pixel elements as comprising a blue emitter disposed within and at a center of a hypothetical, pixel-area defining square, where the center of the square is disposed at an origin of an X, Y coordinate system having a first, a second, a third, and a fourth quadrant organized in said order around the origin and where the pixel-area defining, hypothetical square is hypothetically subdivided symmetrically to also have corresponding first through fourth quadrants of the square, wherein said blue emitter is square-shaped, having four sides each extending parallel to on one or the other of the X and Y axes of said coordinate system, where the pixel-area defining, hypothetical square further encloses a pair of respective first and second red emitters spaced apart from said blue emitter and symmetrically disposed about said blue emitter so as to be respectively disposed in said second and said fourth quadrants of the hypothetical square, wherein said red emitters occupy respective portions of said second and said fourth quadrants of the hypothetical square not occupied by said blue emitter, wherein said red emitters are L-shaped, and where the pixel-area defining, hypothetical square further encloses a pair of respective first and second green emitters spaced apart from said blue emitter so as to be respectively and symmetrically disposed about said blue emitter in said first and said third quadrants of the hypothetical square, wherein said green emitters occupy respective portions of said first and said third quadrants of the hypothetical square not occupied by said blue emitter, wherein said green emitters are L-shaped; and selectively applying luminance-defining drive signals and row select drive signals to said blue emitter, said red emitters, and said green emitters of the plural three-color pixel elements, wherein during said a in of the luminance-defining and row select drive signals, said blue emitter of a first of said three-color pixel elements in a first of the rows receives its respective luminance-defining drive signal from a first data line, and the same first data line is coupled to apply a respective other luminance-defining drive signal to another blue emitter of the same first row at a different time.

3. A pixel element for populating a display screen, the pixel element having six non-overlapping polygon shaped areas (A1-A6) each of a pre-specified unit area and the pixel element comprising:

(a) first and second red light emitters (R1, R2) each structured to emit a red light respectively and exclusively from within a respective one of first and second ones (A1, A2) of the polygon shaped areas;

(b) first and second blue light emitters (B1, B2) each structured to emit a blue light respectively and exclusively from within a respective one of third and fourth ones (A3, A4) of the polygon shaped areas;

(c) first and second green light emitters (G1, G2) each structured to emit a green light respectively and exclusively from within a respective one of fifth and sixth ones (A5, A6) of the polygon shaped areas;

(d) first and second row select line extension respectively coupled to first and second row select lines of the display screen;

wherein the first, third and fifth polygon shaped areas (A1, A3, A5) define a horizontally extending first row with the third area (A3) being interposed in the first row between the first and fifth areas;

wherein the second, fourth and sixth polygon shaped areas (A2, A4, A6) define a horizontally extending second row that is vertically adjacent to the first row, with the fourth area (A4) being interposed in the second row between the second and sixth areas such that the fourth area (A4) is adjacent to the third area (A3);

wherein the first red light emitter (R1) is positioned at a first end of the first row and the second red light emitter (R2) is positioned at an opposed second end of the second row;

wherein the first red light emitter (R1) and the first green light emitters (G1) are individually addressable by activating the first row select line that couples correspondingly to the first select line extension of the pixel element;

wherein the second red light emitter (R2) and the second green light emitters (G2) are individually addressable by activating the second row select line that couples correspondingly to the second select line extension of the pixel element; and wherein the first and second blue light emitters (B1, B2) are commonly addressable by only one of the first and second row select lines that couple to said pixel element by way of a corresponding one of the first and second select line extensions.

4. The pixel element of claim 3, wherein said polygon shaped areas each has the shape of a square.

5. The pixel element of claim 3, wherein said polygon shaped areas each has the shape of an irregular rectangle.

6. A method of driving a plurality of three-color pixel elements disposed one adjacent to the next and populating a screen in a display, the method comprising:

(a) providing each of the pixel element as having six non overlapping polygon shaped areas (A1 A6) each of a pre specified unit area, where each pixel element comprises:

(a.1) first and second red light emitters (R1, R2) each structured to emit a red light respectively and exclusively from within a respective one of first and second ones (A1, A2) of the polygon shaped areas;

(a.2) first and second blue light emitters (B1, B2) each structured to emit a blue light respectively and exclusively from within a respective one of third and fourth ones (A3, A4) of the polygon shaped areas;

(a.3) first and second green light emitters (G1, G2) each structured to emit a green light respectively and exclusively from within a respective one of fifth and sixth ones (A5, A6) of the polygon shaped areas;

(a.4) first and second row select line extension respectively coupled to first and second row select lines of the display screen;

wherein the first, third and fifth polygon shaped areas (A1, A3, A5) define a horizontally extending first row with the third area (A3) being interposed in the first row between the first and fifth areas;

wherein the second, fourth and sixth polygon shaped areas (A2, A4, A6) define a horizontally extending second row that is vertically adjacent to the first row, with the fourth area (A4) being interposed in the second row between the second and sixth areas such that the fourth area (A4) is adjacent to the third area (A3);

wherein the first red light emitter (R1) is positioned at a first end of the first row and the second red light emitter (R2) is positioned at an opposed second end of the second row;

wherein the first red light emitter (R1) and the first green light emitters (G1) are individually addressable by activating the first row select line that couples correspondingly to the first select line extension of the pixel element;

wherein the second red light emitter (R2) and the second green light emitters (G2) are individually addressable by activating the second row select line that couples correspondingly to the second select line extension of the pixel element; and wherein the first and second blue light emitters (B1, B2) are commonly addressable by only one of the first and second row select lines that couple to said pixel element by way of a corresponding one of the first and second select line extensions; and (b) selectively applying luminance-defining drive signals and row select drive signals to said blue emitters, said red emitters, and said green emitters of the plural three-color pixel elements, wherein during said applying of the luminance-defining and row select drive signals, said blue emitters of a first of said three-color pixel elements in a first of the rows receives its respective luminance-defining drive signal from a first data line, and the same first data line is coupled to apply a respective other luminance-defining drive signal to another pair of blue emitter of the same first row at a different time.

* * * * *